(12) United States Patent
Yoshida et al.

(10) Patent No.: US 7,146,811 B2
(45) Date of Patent: Dec. 12, 2006

(54) HYDROSTATIC CONTINUOUSLY VARIABLE TRANSMISSION

(75) Inventors: Yoshihiro Yoshida, Wako (JP);
Kazuhiko Nakamura, Wako (JP);
Kenji Sakakibara, Wako (JP);
Yoshihisa Kanno, Wako (JP);
Toshimasa Mitsubori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 26 days.

(21) Appl. No.: 11/077,954

(22) Filed: Mar. 11, 2005

(65) Prior Publication Data

US 2005/0198952 A1 Sep. 15, 2005

(30) Foreign Application Priority Data

Mar. 12, 2004 (JP) ............................. 2004-070332

(51) Int. Cl.
*F16H 39/14* (2006.01)
(52) U.S. Cl. .......................................... 60/489; 60/494
(58) Field of Classification Search .................. 60/435, 60/436, 487, 488, 489, 494
See application file for complete search history.

(56) References Cited

U.S. PATENT DOCUMENTS 5,353,595 A * 10/1994 Hayashi et al. ................ 60/489
5,575,151 A * 11/1996 Hayashi et al. ................ 60/489

FOREIGN PATENT DOCUMENTS

| JP | 6-42446 | 2/1994 |
|---|---|---|
| JP | 9-100909 | 4/1997 |
| JP | 2920772 | 4/1999 |

* cited by examiner

*Primary Examiner*—Thomas E. Lazo
(74) *Attorney, Agent, or Firm*—Hamre, Schumann, Mueller & Larson, PC

(57) ABSTRACT

In a hydrostatic continuously variable transmission, a hydraulic pump and a hydraulic motor are connected through a hydraulic closed circuit and the capacity of the hydraulic motor is varied to vary the speed continuously. The transmission has a valve spool in a spool hole made in a transmission output shaft which rotatably holds the hydraulic pump and hydraulic motor; and the transmission output shaft incorporates outer branch oil paths which are connected with an outer passage and open to the spool hole, and an inner branch oil path which is connected with an inner passage and open to the spool hole. A right groove on the outer periphery of the valve spool enables the valve spool to move between a clutch release position in which the outer branch oil paths and the inner branch oil path are connected and a clutch engagement position in which a central land of the valve spool at least covers a high pressure clutch port; and the right groove is connected to the outside through a discharge oil path with an orifice.

11 Claims, 16 Drawing Sheets

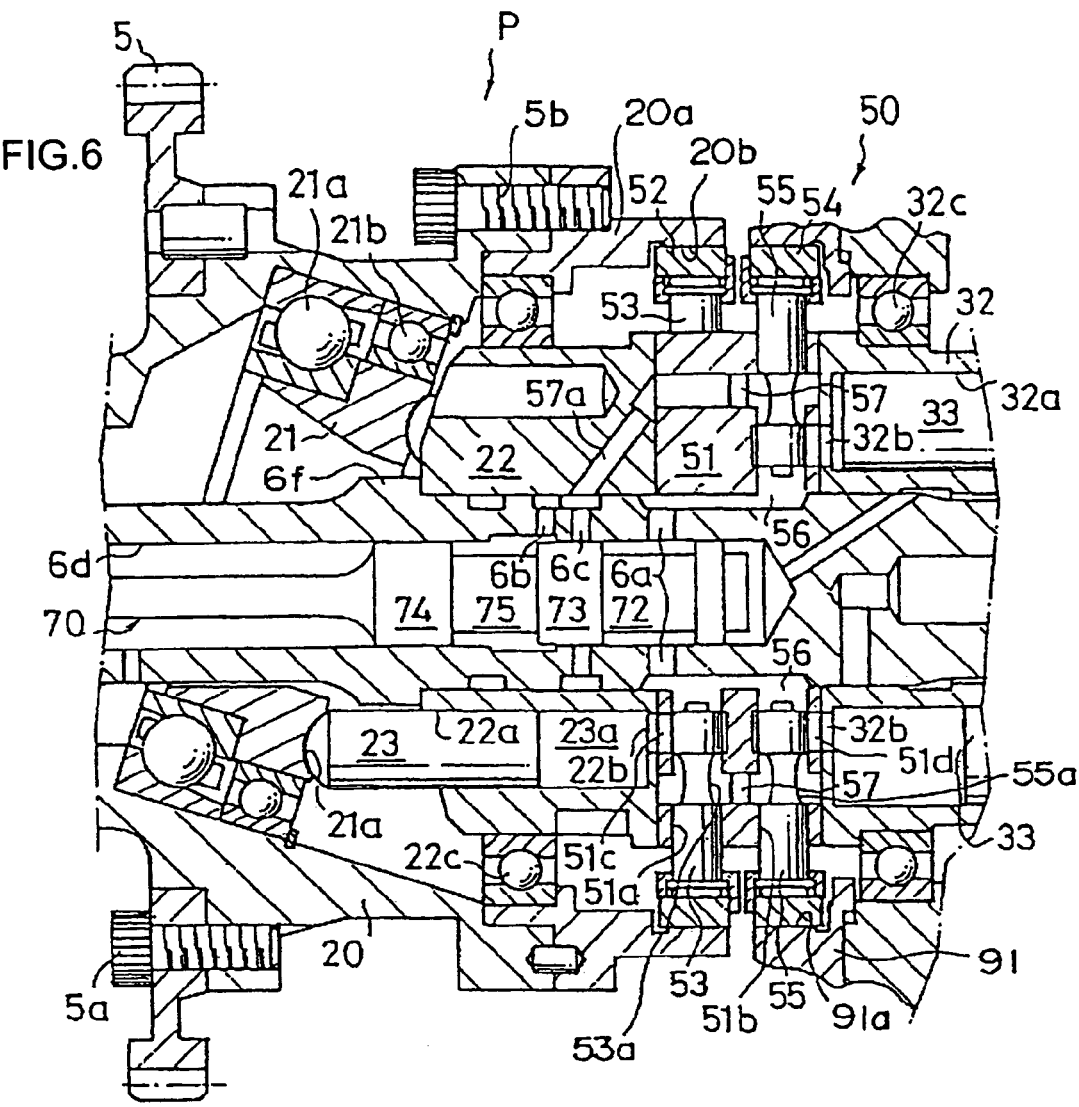
FIG.6
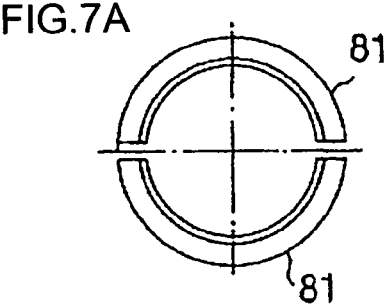
FIG.7A
FIG.7B

82

82a
82b

83

83

HYDROSTATIC CONTINUOUSLY VARIABLE TRANSMISSION

TECHNICAL FIELD

The present invention relates to a hydrostatic continuously variable transmission in which a hydraulic pump and a hydraulic motor are connected through a hydraulic closed circuit and the capacity of at least one of the hydraulic pump and hydraulic motor is varied to change the input rotating speed of the hydraulic pump and obtain an output rotating speed of the hydraulic motor.

BACKGROUND OF THE INVENTION

Various types of hydrostatic continuously variable transmissions have been known and commercialized. Some examples are hydrostatic continuously variable transmissions disclosed in Patent Documents 1, 2, and 3 which the present applicant proposed. The hydrostatic continuously variable transmissions disclosed in these patent documents include a swash plate plunger pump, a swash plate plunger motor, and a hydraulic closed circuit connecting the discharge port and intake port of the swash plate plunger pump to the discharge port and intake port of the swash plate plunger motor, where a pump swash plate member is driven by an engine and a pump cylinder and a motor cylinder are joined and disposed together on an output shaft, rotation of a motor swash plate member is controlled and the motor swash plate angle is adjustable.

It has been known that in this type of hydrostatic continuously variable transmission, a clutch valve which connects or disconnects the high pressure oil path and low pressure oil path which constitute the hydraulic closed circuit is provided and clutching operation is done to control the magnitude of rotational driving force from the hydraulic pump to be transmitted to the hydraulic motor or stop this rotational force transmission. For example, Patent Document 3 discloses an automatic clutch device which uses a clutch valve like this. This clutch valve includes a spring (biasing means) for biasing it toward the opening direction and a hydraulic governor for generating a governor oil pressure corresponding to input rotating speed, and opens or closes according to the spring biasing force and the governor force (governor oil pressure) so as to connect or disconnect the high pressure oil path and the low pressure oil path.

[Patent Document 1] JP-A No. 42446/1994
[Patent Document 2] JP-B No. 2920772
[Patent Document 3] JP-A No. 100909/1997

In the above clutch valve, when the engine rotating speed (input rotating speed) is low (for example, during engine idling), the spring biasing force prevails and opens the clutch valve; and when the engine rotating speed is high, the governor force prevails and closes the clutch valve. However, the problem is that at the time of start of a vehicle when the clutch is partially engaged, namely the clutch valve is partially open, it is necessary to add an oil cooling device or improve the performance of an oil cooling device because only some of the engine power is used as a driving force and the rest of the engine power might cause the working oil temperature in the hydraulic closed circuit to rise.

SUMMARY OF THE INVENTION

The present invention has been made in view of this problem and has an object to provide a hydrostatic continuously variable transmission which prevents rise in the temperature of working oil in a hydraulic closed circuit, and more particularly rise in the temperature of working oil with the clutch valve partially open (partial clutch engagement state).

Therefore, in a hydrostatic continuously variable transmission according to the present invention, a hydraulic pump and a hydraulic motor are connected through a hydraulic closed circuit and the capacity of at least one of the hydraulic pump and hydraulic motor is varied to change the input rotating speed of the hydraulic pump and obtain an output rotating speed of the hydraulic motor; a valve spool is movably provided in a spool hole which extends axially in a support shaft which rotatably holds the hydraulic pump and hydraulic motor; the support shaft incorporates high pressure clutch oil paths connected to a high pressure oil path as a constituent of the hydraulic closed circuit and having a high pressure clutch port open to the spool hole, and a low pressure clutch oil path connected to a low pressure oil path as a constituent of the hydraulic closed circuit and having a low pressure clutch port open to the spool hole. And a communication groove formed on the outer periphery of the valve spool enables the valve spool to move between a clutch release position in which the high pressure clutch port and the low pressure clutch port are connected and a clutch engagement position in which an outer peripheral surface of the valve spool at least covers the high pressure clutch port; and the communication groove is connected to the outside through a main discharge oil path formed in the valve spool.

In this hydrostatic continuously variable transmission, it is preferable that the main discharge oil path consists of an oil reservoir oil chamber extending axially in the valve spool and a working oil discharge hole made in the valve spool which penetrates from the oil reservoir oil chamber to the outside.

It is also preferable that a shaft side auxiliary discharge oil path which is open to the outside at one end and to the spool hole at the other end is formed in the support shaft and a spool side auxiliary discharge oil path connected to the main discharge oil path and open to an outer peripheral surface is formed in the valve spool; and when the valve spool is in a partial clutch engagement position in which the communication groove is partially connected with the high pressure clutch port, the shaft side auxiliary discharge oil path and the spool side auxiliary discharge oil path are connected.

According to the above hydrostatic continuously variable transmission in the present invention, since the communication groove formed on the outer periphery of the valve spool is connected to the outside through the main discharge oil path formed in the valve spool, some of the working oil in the hydraulic closed circuit is forced out through the main discharge path when the clutch valve is partially open (partial clutch engagement state). Therefore, the working oil whose temperature has become high in the partial clutch engagement state can be discharged out through the main discharge oil path and cooled fresh working oil can be supplied to the hydraulic closed circuit so that rise in the temperature of working oil in the hydraulic closed circuit can be prevented.

In this case, when the main discharge oil path consists of an oil reservoir oil chamber extending axially in the valve spool and a working oil discharge hole made in the valve spool which penetrates from the oil reservoir oil chamber to the outside, the main discharge oil path structure can be simplified and the transmission can be compact.

It is preferable that when the valve spool is in a partial clutch engagement position (the clutch valve is partially open, or the clutch is partially engaged), the shaft side auxiliary discharge oil path and the spool side auxiliary discharge oil path are connected; and if that is the case, the working oil whose temperature has become high due to engine power in the partial clutch engagement state can be discharged out through not only the main discharge oil path but also the auxiliary discharge oil path so that rise in the temperature of working oil in the hydraulic closed circuit can be prevented more effectively.

BRIEF DESCRIPTION OF THE DRAWINGS

FIG. 6 is a sectional view which partially shows the above hydrostatic continuously variable transmission in enlarged form.

FIG. 7 is a front view and a sectional view which show the cotter member used for positioning the rotor of the above hydrostatic continuously variable transmission.

DETAILED DESCRIPTION OF THE PREFERRED EMBODIMENT

Figure 2:
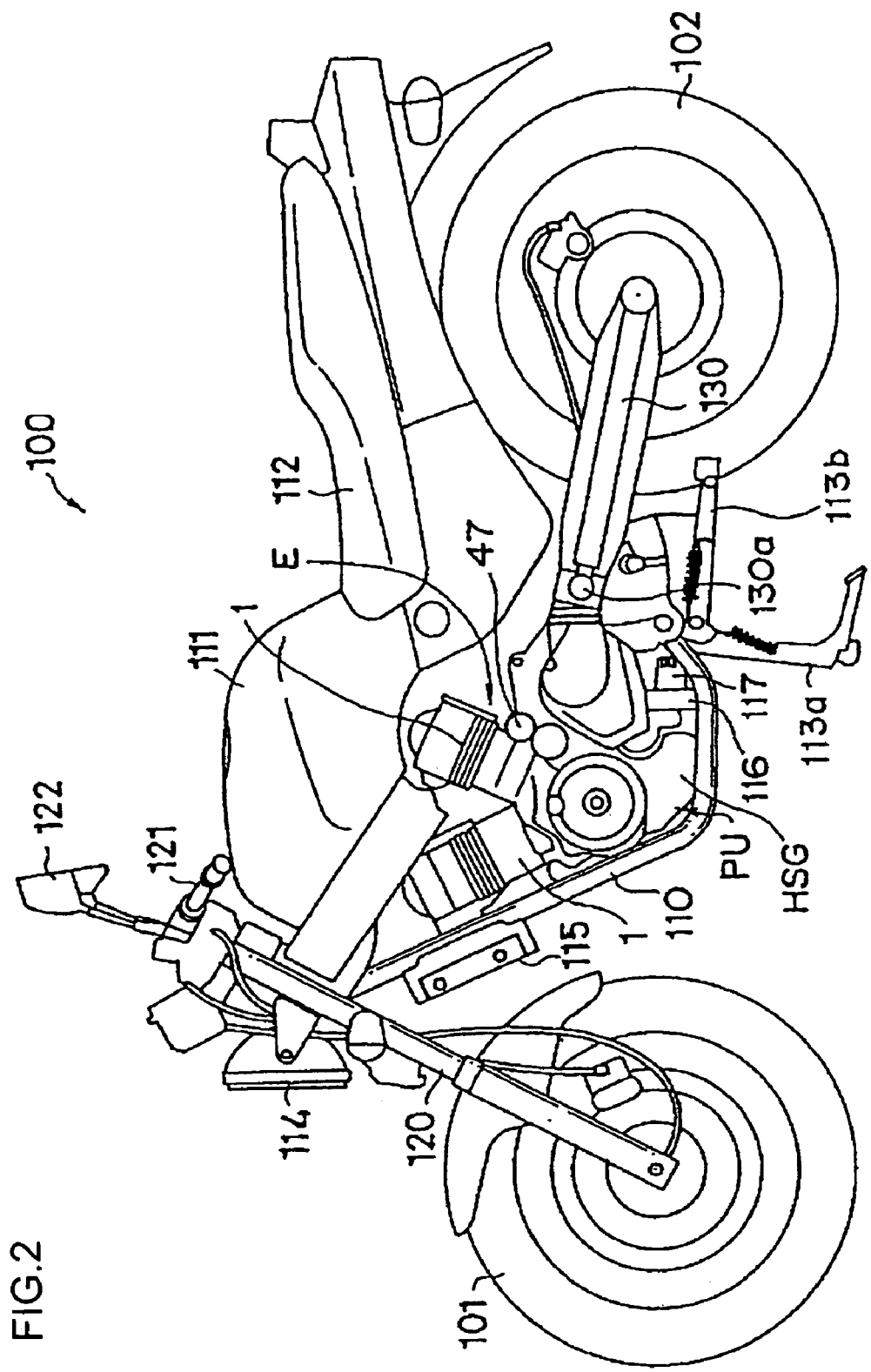
FIG. 2 is an external view which shows a motorcycle having the above hydrostatic continuously variable transmission.

Next, a preferred embodiment of the present invention will be described referring to drawings. First, FIG. 2 shows an overall external appearance of a motorcycle having a hydrostatic continuously variable transmission according to the present invention. In FIG. 2, the internal structure of the motorcycle is partially exposed with a side cover member removed. This motorcycle 100 includes: a main frame 110; a front fork 120 rotatably fitted around a shaft extending vertically and obliquely at the front end of the main frame 110; a front wheel 101 rotatably fitted to the lower end of the front fork 120; a swing arm 130 pivotally connected around a pivotal connection shaft 130a extending horizontally behind the main frame 110 and fitted vertically in an oscillatable manner; and a rear wheel 102 rotatably fitted to the rear end of the swing arm 130.

Attached to the main frame 110 are: a fuel tank 111; a rider seat 112, a main stand 113a and a sub stand 113b for holding the vehicle in an upright position during its stop; a headlight 114 for illuminating ahead; a radiator 115 for cooling engine cooling water; a power unit PU for generating a rotational driving force for the rear wheel 102 and so on. A handlebar 121 (steering handlebar) steered by a rider; a rear view mirror 122 for obtaining a back view and so on are attached to the front fork 120. A drive shaft for transmitting the rotational driving force generated by the power unit PU to the rear wheel as stated later is located inside the swing arm 130.

In this motorcycle 100, the power unit PU uses a hydrostatic continuously variable transmission (CVT) according to the present invention. This power unit is explained below. First, FIG. 3 shows the general structure of the power unit PU which includes: an engine E which generates a rotational driving force; a hydrostatic continuously variable transmission CVT which continuously varies its output rotating speed; and a transmission gear array GT which changes the direction of output rotation of this hydrostatic continuously variable transmission CVT and transmits it.

Figure 3:
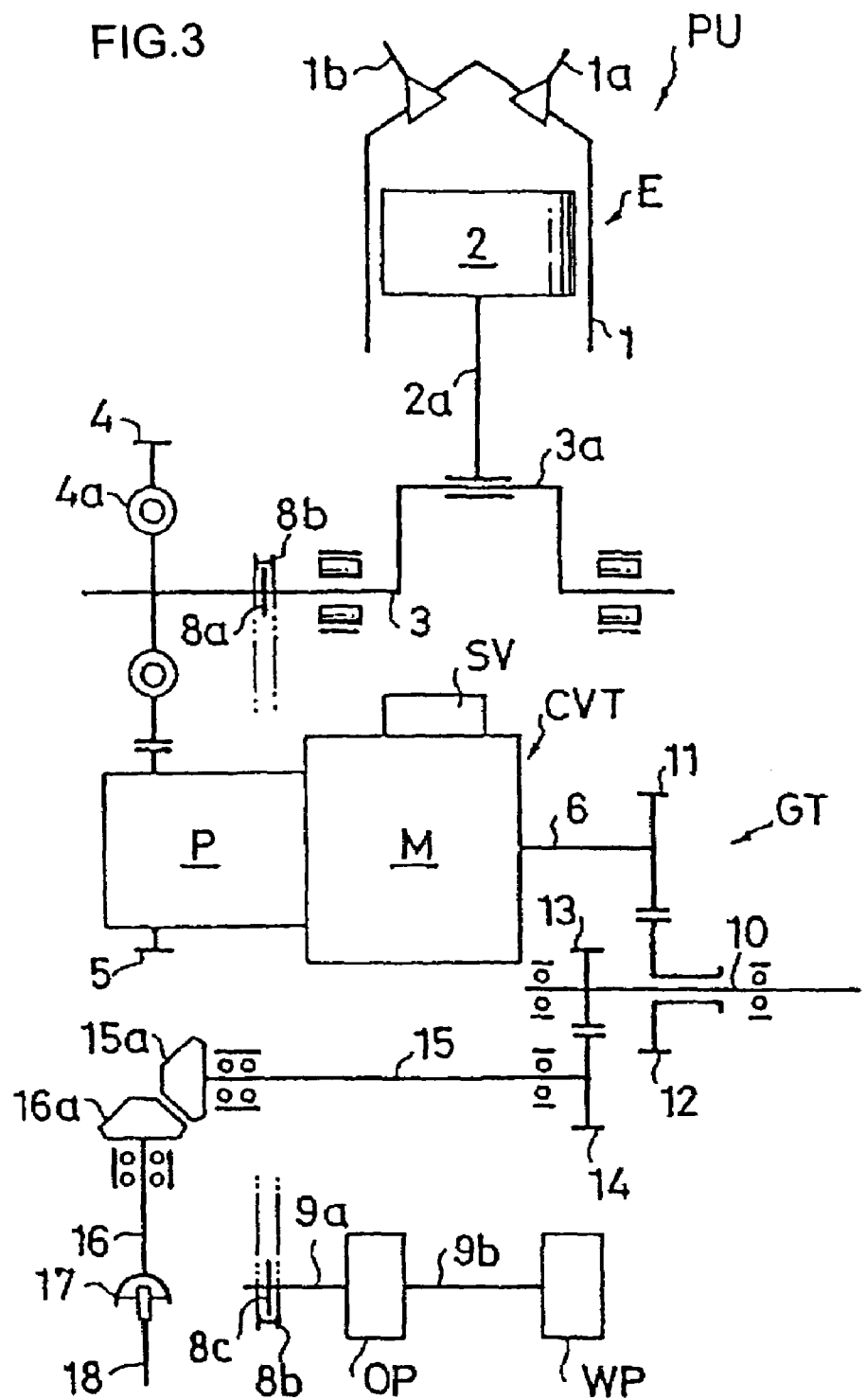
FIG. 3 is a schematic view which shows the structure of the power transmission route of the power unit having the above hydrostatic continuously variable transmission.

As shown in FIG. 3, the engine E consists of a V-cylinder engine with a V bank and a cylinder 1 extends in a V form (extends upward back and forth and obliquely). This engine E has a piston 2 in the cylinder 1 with an intake valve 1a and an exhaust valve 1b. In the engine E, the intake valve 1a and the exhaust valve 1b are opened/closed at a prescribed time to induce combustion of an air-fuel mixture in the cylinder chamber so that the piston 2 reciprocates and the reciprocating motion of the piston 2 is transmitted through a connecting rod 2a to the crank section 3a to rotate a crank shaft 3. An input drive gear 4 with a damper 4a is fitted to an end of the crank shaft 3 and the rotational driving force of the crank shaft 3 is transmitted to the input drive gear 4.

A drive sprocket 8a is fitted to the crank shaft 3 and the rotational driving force is transmitted through a chain 8b to a driven sprocket 8c fitted to pump drive shafts 9a and 9b. An oil pump OP and a water pump WP are disposed on the pump drive shafts 9a and 9b as shown, and driven by the engine E. The working oil discharged from the oil pump OP is supplied as a replenisher oil or a lubricant for the hydrostatic continuously variable transmission CVT as stated later and, as shown in FIG. 2, cooled by an oil cooler 116 behind and below the power unit PU and filtered by an oil filter 117. The cooling water discharged from the water pump WP is used to cool the engine E and the cooling water which has been warmed by the engine E is cooled by the radiator 115.

The hydrostatic continuously variable transmission CVT includes a swash plate plunger type hydraulic pump P and a swash plate plunger type hydraulic motor M. An input driven gear 5 coupled with the pump casing of the swash plate plunger type hydraulic pump P engages with the above input drive gear 4 so that the rotational driving force of the engine E is transmitted to the input driven gear 5 to rotate the pump casing. Here, the hydraulic pump P is of the fixed capacity type with a constant swash plate angle and the hydraulic motor M is of the variable capacity type with a variable swash plate angle which has a motor servo system SV for adjusting the motor swash plate angle. The output rotating speed which has been continuously varied by this hydrostatic continuously variable transmission CVT is outputted to a transmission output shaft 6 (details of the hydrostatic continuously variable transmission CVT will be described in detail later).

The transmission output shaft 6 is connected with the transmission gear array GT so that rotation of the transmission output shaft 6 is switched from "forward" to "neutral" or vice versa or decelerated through the transmission gear array GT. The transmission gear array GT has a counter shaft 10 and a first output drive shaft 5 which extend parallel to the transmission output shaft 6 and includes: a first gear 11 coupled with the transmission output shaft 6; a second gear 12 mounted on the counter shaft 10 in a manner to be axially movable and rotate integrally with the counter shaft 10; a third gear 13 coupled with the counter shaft 10, and a fourth gear 14 always engaged with the third gear 13 and coupled with the first output drive shaft 15. The second gear 12 is moved above the counter shaft 10 axially; when it is engaged with the first gear 11, the vehicle is in the forward position and when it is disengaged from the first gear 11, the vehicle is in the neutral position.

On the other hand, an output drive bevel gear 15a is fitted to an end of the first output drive shaft 15; rotational driving force is transmitted from an output driven bevel gear 16a engaged with this output drive bevel gear 15a to a second output drive shaft 16. The second output drive shaft 16 is connected through a universal joint 17 to a drive shaft 18; as mentioned above, the drive shaft 18 penetrates the swing arm 130 and connects to the rear wheel 102 so that the rotational driving force is transmitted to the rear wheel 102 to drive it. The universal joint 17 lies coaxially with the pivotal connection shaft 130a of the swing arm 130 for the main frame 110.

Next, the above hydrostatic continuously variable transmission CVT will be described referring to FIGS. 1 and 4 to 6. The hydrostatic continuously variable transmission CVT includes a swash plate plunger type hydraulic pump P and a swash plate plunger type hydraulic motor M and the transmission output shaft 6 penetrates its center. The transmission output shaft 6 is rotatably held on the transmission housing HSG by means of ball bearings 7a, 7b and 7c.

The hydraulic pump P is composed of: a pump casing 20 disposed over the transmission output shaft 6 coaxially in a relatively rotatable manner; a pump swash plate member 21 disposed inside the pump casing 20 at a prescribed angle with respect to the rotation center axis of the pump casing 20; a pump cylinder 22 disposed opposite to the pump swash plate member 21; and a plurality of pump plungers 23 disposed slidably inside a plurality of pump plunger holes 22a which extend axially in a pattern like a ring surrounding the center axis of the pump cylinder 22. The pump casing 20 is rotatably held on the transmission output shaft 6 and the pump cylinder 22 by means of bearings 7b and 22c and rotatably held on the transmission housing HSG by a bearing 7a. The pump swash plate member 21 is disposed in a way to rotate around the above shaft tilted at the prescribed angle by means of bearings 21a and 21b. In other words, the pump cylinder 22 is coaxially held on the pump casing 20 in a relatively rotatable manner by means of the bearing 22c.

The input driven gear 5 is fastened onto the outer periphery of the pump casing 20 with a bolt 5a. The outer ends of the pump plungers 23 protrude outward and touch and engage with the swash plate 21a of the pump swash plate member 21 and their inner ends inside the pump plunger holes 22a face a valve body 51 of a distribution valve 50 (stated later) and form pump oil chambers 23a. A pump opening 22b which functions as a pump discharge/intake port is formed at the end of each pump plunger hole 22a. As mentioned above, when the input driven gear 5 is rotated, the pump casing 20 is rotated and the pump swash plate member 21 inside it oscillates with rotation of the pump casing 20; the pump plungers 23 reciprocate inside the pump plunger holes 22a as the swash plate 21a oscillates; and working oil inside the pump oil chambers 23 is discharged or taken in.

A pump eccentric member 20a is coupled with the right end of the pump casing 20 as shown in the figure through a bolt 5b. The inner peripheral surface 20b of the pump eccentric member 20a is cylindrical and eccentric to the rotation axis of the pump casing 20. Since the pump eccentric member 20a with an eccentric inner peripheral surface 20b is separate from the pump casing 20, it is easily manufactured.

The hydraulic motor M is composed of: a motor casing 30 (composed of plural casings 30a and 30b) joined to the transmission housing HSG and fixed on it; a motor oscillating member 35 which is held, in a sliding manner, on a support spherical surface 30c formed on the inner surface of the motor casing 30 (casing 30b) and extends perpendicularly to the center axis of the transmission output shaft 6 (vertically as viewed in the figure) in a way to be able to oscillate around the oscillation center O; a motor swash plate member 31 rotatably held inside the motor swash plate member 35 by bearings 31a and 31b; a motor cylinder 32 opposite to the motor swash plate member 31; and a plurality of motor plungers 33 disposed slidably inside a plurality of motor plunger holes 32a which are pierced axially in a pattern like a ring surrounding the center axis of the motor cylinder 32. The motor cylinder 32 is rotatably held by the motor casing 30 through a bearing 32c on its outer periphery.

Figure 15:
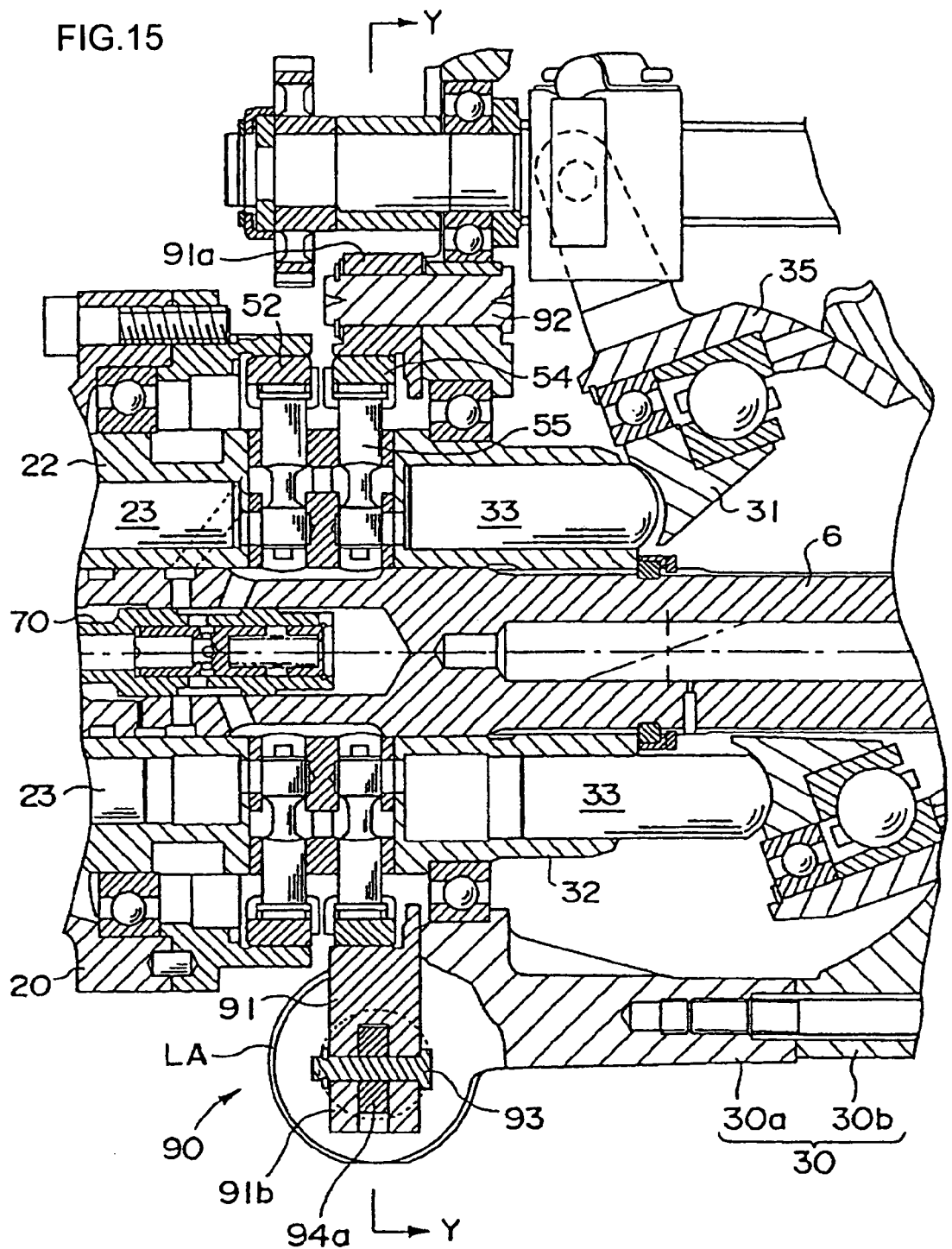
FIG. 15 is a sectional view which shows the structure of the lockup mechanism of the above hydrostatic continuously variable transmission.

In the hydraulic motor M, a lockup mechanism 90 (see FIGS. 15 to 17) is provided at the left end of the motor casing 39 (as viewed in the figure) and a motor eccentric member 91 as a component of this lockup mechanism 90 is in contact with the end of the motor casing 30b in a sliding manner. A cylindrical inner surface 91a formed on the motor eccentric member 91 oscillates between a lockup position and a normal position where the lockup position is coaxial with the motor cylinder 32 and the normal position is eccentric to the rotation axis of the motor cylinder 32 (the lockup mechanism 90 will be stated later).

The outer ends of the motor plungers 33 protrude outward and engage with the swash plate 31a of the motor swash plate member 31 and their inner ends inside the plunger holes 32a face the valve body 51 and form motor oil chambers 33a in the motor plunger holes 32a. A motor opening 32b which functions as a motor discharge/intake port is formed at the end of each motor plunger hole 32a. An arm 35a as an end of the motor oscillating member 35 protruding outward protrudes radially outward and connects to the motor servo system SV and the motor servo system SV controls leftward/rightward movement of the arm 35a as viewed in FIG. 1, etc. to control oscillation of the motor oscillating member 35 around the oscillation center O. When the motor oscillating member 35 is oscillated in this way, the motor swash plate member 31 rotatably held inside it also oscillates at the same time and its swash plate angle changes.

Figure 5:
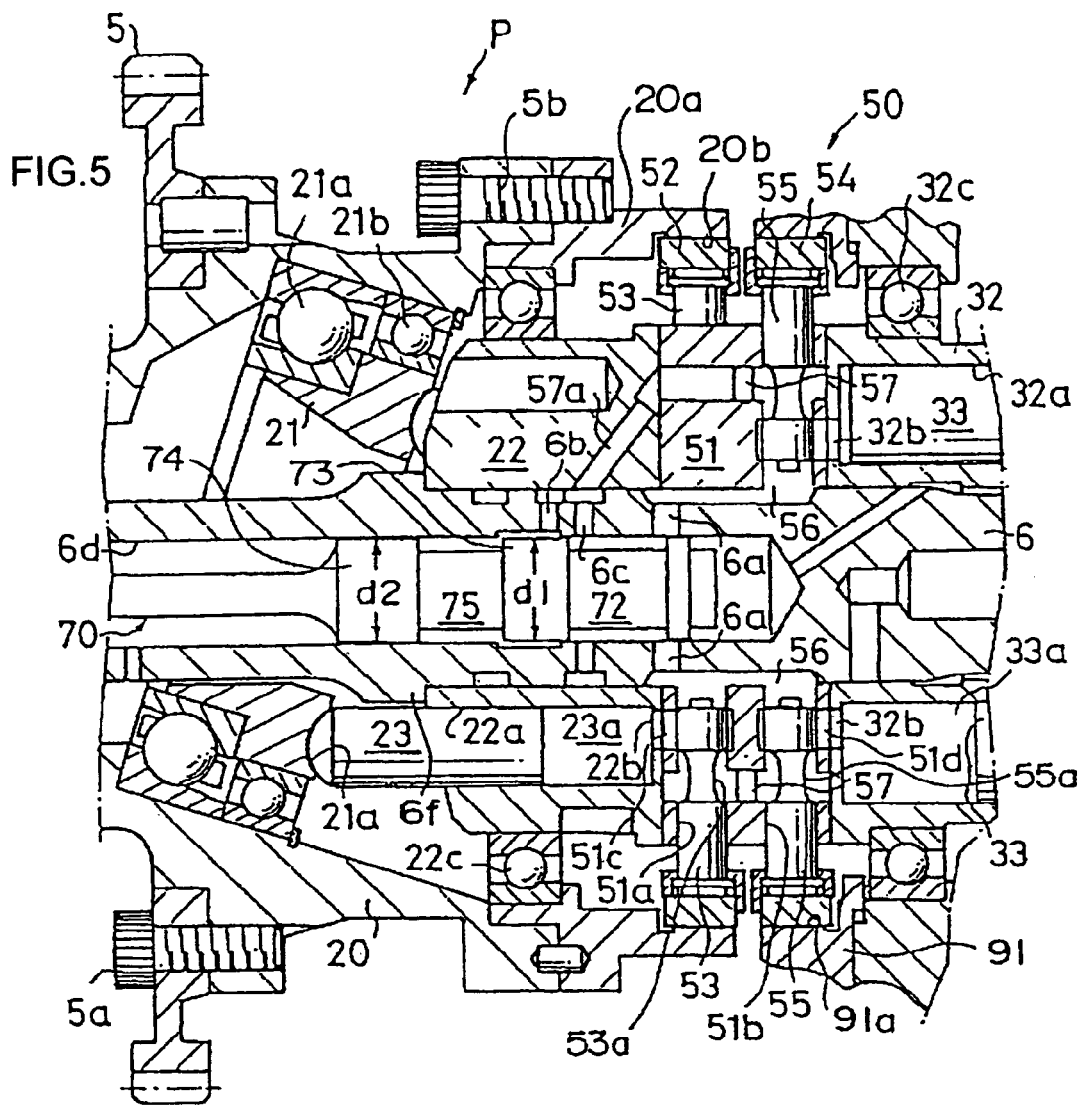
FIG. 5 is a sectional view which partially shows the above hydrostatic continuously variable transmission in enlarged form.

The distribution valve 50 lies between the pump cylinder 22 and the motor cylinder 32. FIGS. 5 and 6 show this part in an enlarged form. The valve body 51 of the distribution valve 50 is integrally joined between the pump cylinder 22 and the motor cylinder 32 by brazing and also the motor cylinder 32 is splined to the transmission output shaft 6. Therefore, the pump cylinder 22, distribution valve 50, motor cylinder 32 and transmission output shaft 6 rotate together.

The pump cylinder 22, distribution valve 50 (its valve body 51) and motor cylinder 32 which are integrally joined in this way are called an output rotor. How this output rotor is positioned and fixed on the transmission output shaft 6 at a prescribed position in its axial direction is described next. For this positioning, a flange-like regulator 6f protruding outward is formed on the transmission output shaft 6 and the left position of the output rotor is determined by the left end face of the pump cylinder 22 touching the regulator 6f. On the other hand, the right position of the output rotor is determined by a latch member 80 fitted to the transmission output shaft 6 facing the right end face of the motor cylinder 32.

Figure 8A:
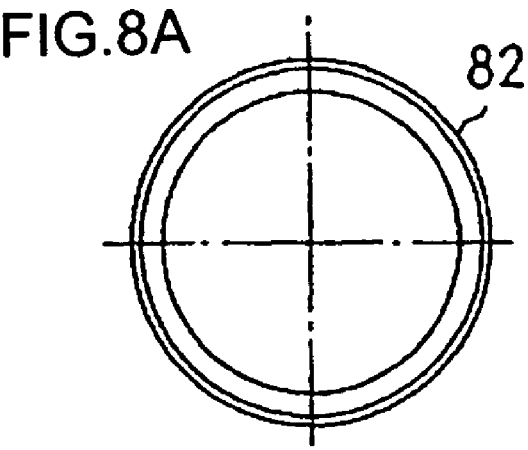
FIG. 8 is a front view and a sectional view which show the retainer ring used for positioning the rotor of the above hydrostatic continuously variable transmission.
Figure 8B:
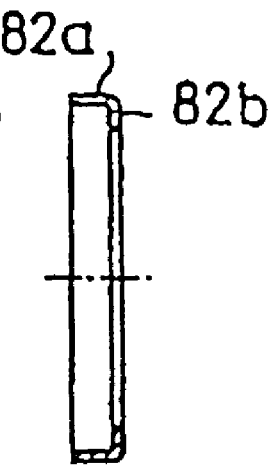
Figure 9A:
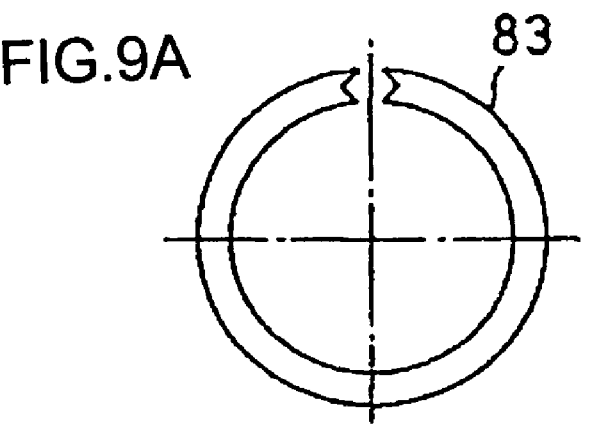
FIG. 9 is a front view and a sectional view which show the cir-clip used for positioning the rotor of the above hydrostatic continuously variable transmission.
Figure 9B:
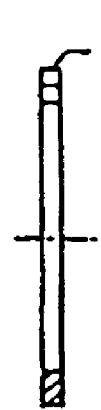
Figure 12:
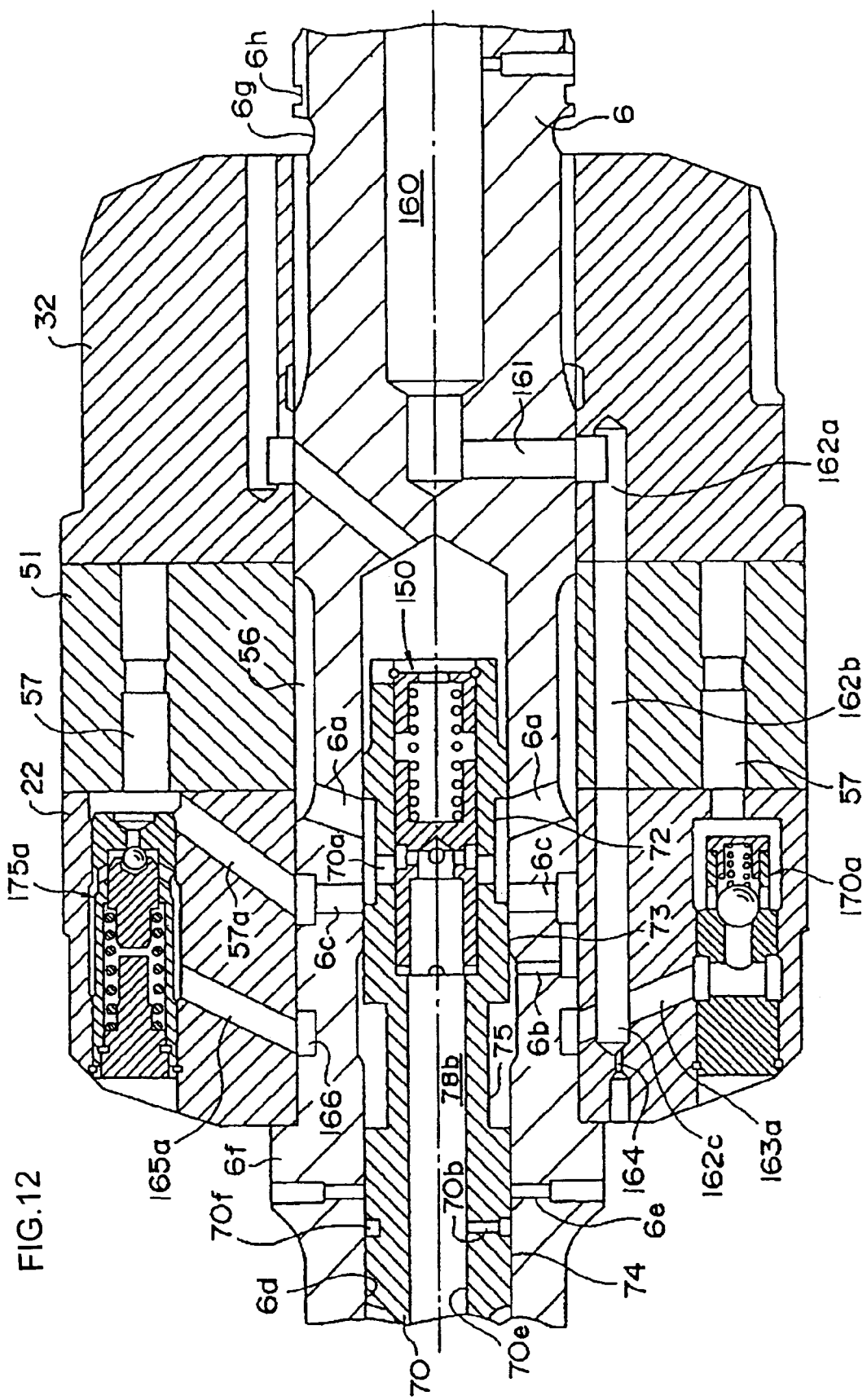
FIG. 12 is a sectional view which shows the structures of the transmission output shaft and output rotor of the above hydrostatic continuously variable transmission.
Figure 13:
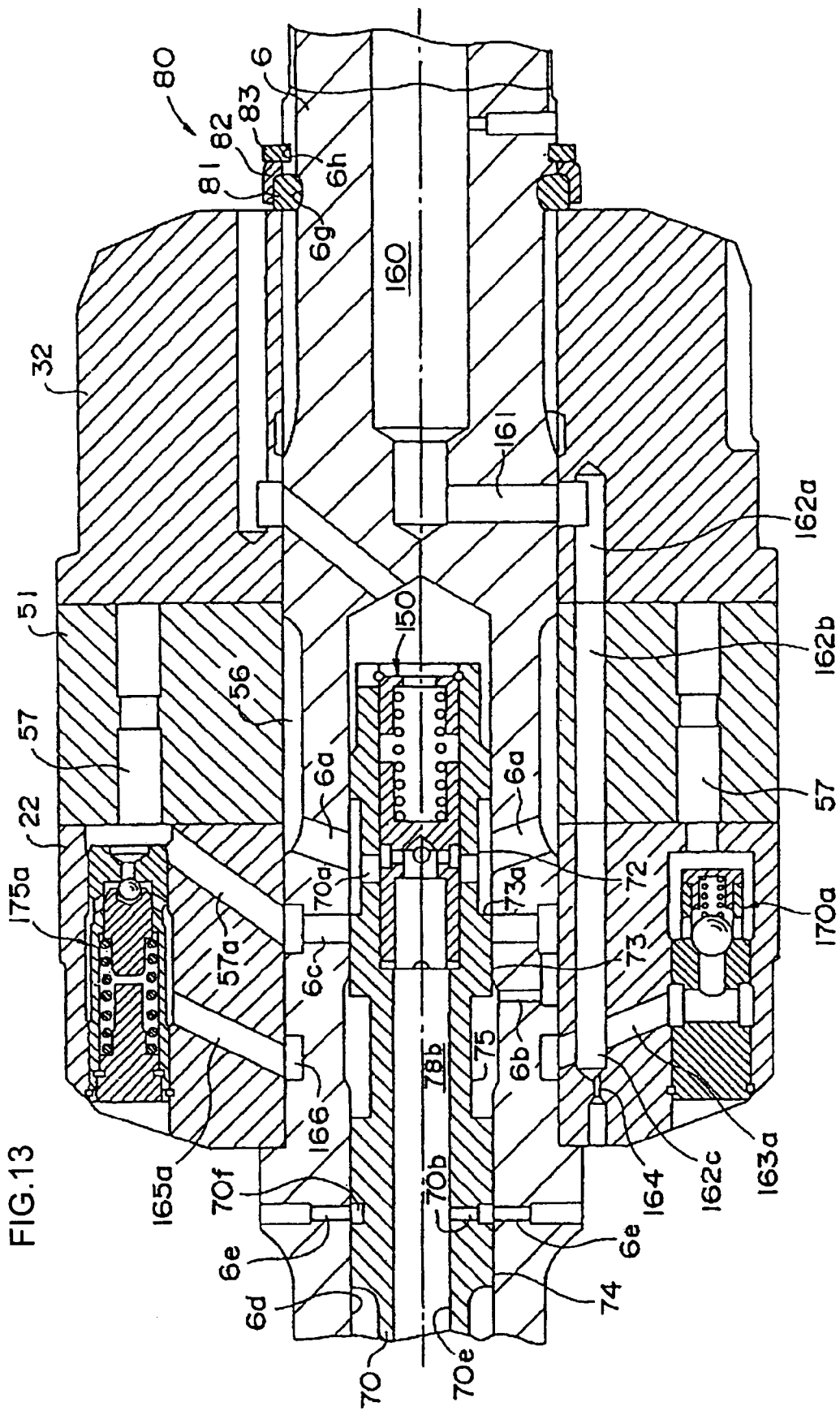
FIG. 13 is a sectional view which shows the structures of the transmission output shaft and output rotor of the above hydrostatic continuously variable transmission.
Figure 14:
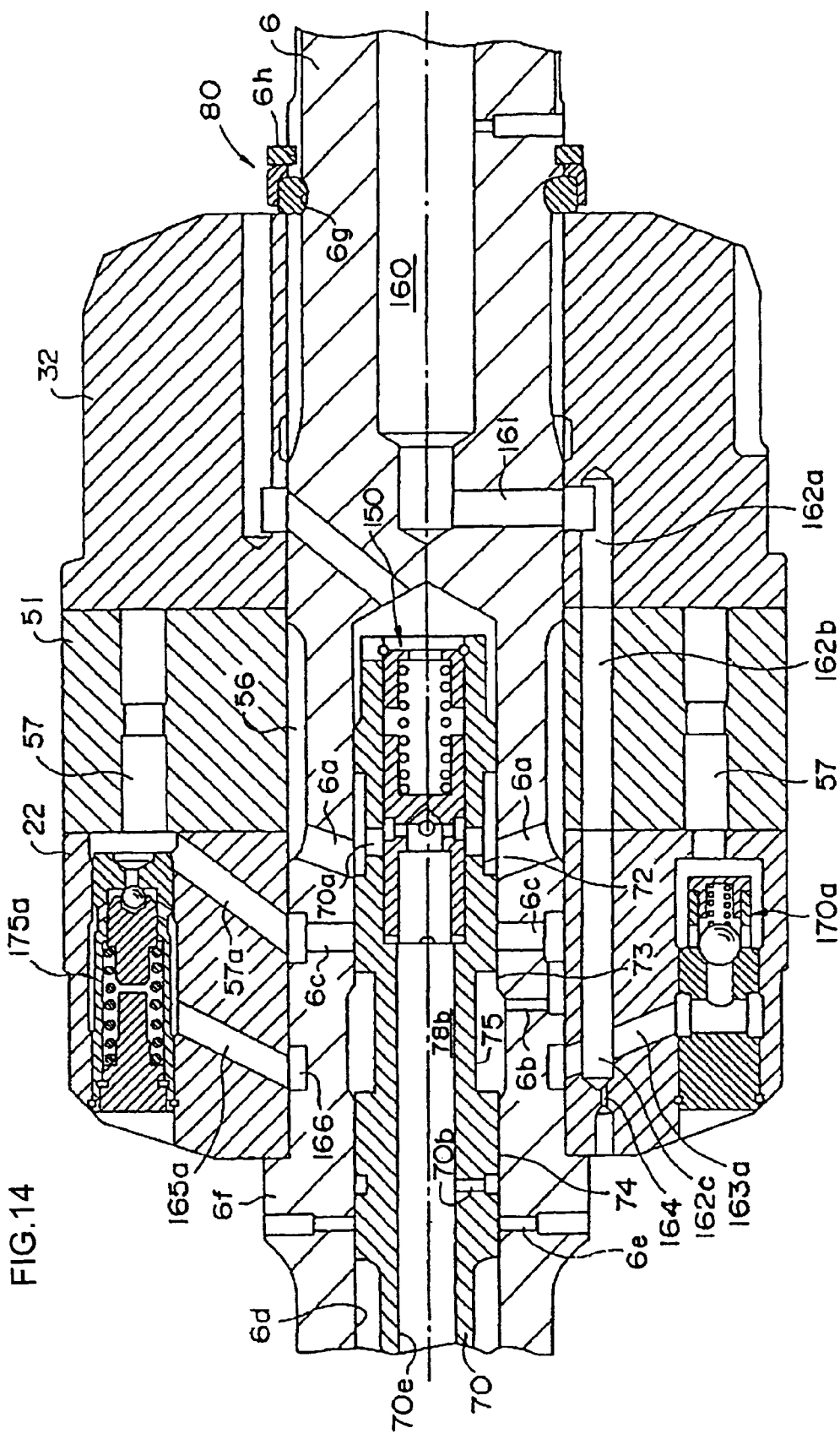
FIG. 14 is a sectional view which shows the structures of the transmission output shaft and output rotor of the above hydrostatic continuously variable transmission.

As illustrated in FIGS. 12 to 14, in order to attach the latch member 80, a first latch groove 6g and a second latch groove which are both annular are made in the transmission output shaft 6. A pair of cotter members 81, each semicircular as shown in FIG. 7, is fitted to the first latch groove 6g with their inner peripheries 81a in the first latch groove 6g. Then, a retainer ring 82 as shown in FIG. 8 is attached on top of this so that a side plate 82b of the retainer ring 82 touches the side face of the cotter member 81 and an outer peripheral plate 82a covers the outer peripheral surface 81 of the cotter member 81 to hold the cotter member 81 as it is. In addition, a cir-clip 83 as shown in FIG. 9 is fitted into the second latch groove 6h to hold the retainer ring 82 as it is. As a consequence, the right end face of the motor cylinder 32 touches the latch member 80 for positioning on the right side. As can be understood from the above structure, the output rotor is sandwiched between the regulator 6f and the latch member 80 and its position is fixed on the transmission output shaft 6.

Next, the distribution valve will be described. As illustrated in FIGS. 5 and 6, in the valve body 51 as a constituent of the distribution valve 50, there are two rows of pump side spool holes 51a and motor side spool holes 51b which extend in the radial direction and are arranged at regular intervals in the circumferential direction. A pump side spool 53 and a motor side spool 55 are slidably fitted into the pump side spool hole 51a and the motor side spool hole 51b, respectively.

The pump side spool holes 51a are formed to match the pump plunger holes 22a, and a plurality of pump side communication passages 51c which connect corresponding pump openings 22b (pump oil chambers 23a) and pump side spool holes 51a are formed in the valve body 51. The motor side spool holes 51a are formed to match the motor plunger holes 32a, and a plurality of motor side communication passages 51d which connect corresponding motor openings 32b (motor oil chambers 33a) and motor side spool holes 51b are formed in the valve body 51.

Furthermore, in the distribution valve 50, a pump side cam ring 52 is provided in a position to surround the outer peripheral end of the pump side spool 53 and a motor side cam ring 54 is provided in a position to surround the outer peripheral end of the motor side spool 55. The pump side cam ring 52 is fitted on the inner surface of the pump eccentric member 20a joined to the end of the pump casing 20 with the bolt 5b inside the inner peripheral surface 20b eccentric to the rotation center axis of the pump casing 20, and rotatably held on the pump casing 20. The motor cam ring 54 is fitted inside an inner peripheral surface 91a of a motor eccentric member 91 which lies in contact with the end of the motor casing 30 in a sliding manner. The outer peripheral end of the pump side spool 53 is latched on the inner peripheral surface of the pump side cam ring 52 in a relatively rotatable manner and the outer peripheral end of the motor side spool 55 is latched on the inner peripheral surface of the motor side cam ring 54 in a relatively rotatable manner.

An inner passage 56 is formed between the inner peripheral surface of the valve body 51 and the outer peripheral surface of the transmission output shaft 6 and the inner peripheral ends of the pump side spool holes 51a and motor side spool holes 51b communicate with this inner passage 56. Also, in the valve body 51, an outer passage 57 is formed to connect the pump side spool holes 51a and the motor side spool holes 51b.

Here, how the above distribution valve 50 works will be described. As the driving force of the engine E is transmitted to the input driven gear 5 to rotate the pump casing 20, the pump swash plate member 21 oscillates with this rotation. Therefore, the pump plunger 23 in contact and engaged with the swash plate surface 21a of the pump swash plate member 21 reciprocates axially in the pump plunger hole 22a as the pump swash plate member 21 oscillates; as the pump plunger 23 moves inward, working oil is discharged from the pump oil chamber 23a through the pump opening 22b, and as it moves outward, working oil is taken into the pump chamber 23a through the pump opening 22b.

At this moment, the pump side cam ring 52 fitted to the inner peripheral surface 20b of the pump eccentric member 20a joined to the end of the pump casing 20 is rotated together with the pump casing 20. However, since the pump side cam ring 52 is eccentric to the rotation center of the pump casing 20, the pump side spool 53 reciprocates radially in the pump side spool hole 51a with rotation of the pump side cam ring 52. When the pump side spool 53 reciprocates in this way and moves from its position as shown in FIGS. 5 and 6 to a more inner position, the pump side communication passage 51c and outer passage 57 communicate with each other through the spool groove 53a; and when the pump side spool 53 moves from its position as shown in FIGS. 5 and 6 to a more outer position, the pump side passage 51c and inner passage 56 communicate with each other.

Here, as the swash plate member 21 oscillates with rotation of the pump casing 20 and the pump plunger 23 reciprocates from its outermost position (called "bottom dead center") to its innermost position (called "top dead center"), the pump side cam ring 52 reciprocates the pump side spool 53 radially. As a consequence, when the pump plunger moves from its bottom dead center to its top dead center and the working oil in the pump oil chamber 23a is discharged through the pump opening 22b, this working oil goes through the pump side communication passage 51c to be sent into the outer passage 57. On the other hand, when the pump plunger moves from the top dead center to the bottom dead center with rotation of the pump casing 20, the working oil in the inner passage 56 goes through the pump side communication passage 51c and pump opening 22b into the pump oil chamber 23a. As can be understood from this, when the pump casing 20 rotates, the working oil discharged from the hydraulic pump P is supplied to the outer passage 57 and working oil is taken into the hydraulic pump through the inner passage 56.

On the other hand, because the motor cam ring 54 fitted to the inner peripheral surface 91a of the motor eccentric member 91 which is in contact with the end of the motor casing 30 in a sliding manner is eccentric to the rotation center of the motor cylinder 32 (output rotor and transmission output shaft 6) when the motor eccentric member 91 is in its normal position, the motor side spool 55 reciprocates in the motor side spool hole 51b radially with rotation of the motor cylinder 32. When the motor side spool 55 reciprocates in this way and moves from its position as shown in FIGS. 5 and 6 to a more inner position, the motor side communication passage 51d and outer passage 57 communicate with each other through the spool groove 55a; and when the motor side spool 55 moves from its position as shown in FIGS. 5 and 6 to a more outer position, the motor side passage 51d and inner passage 56 communicate with each other. The case that the motor eccentric member 91 is in its lockup position will be described later and an explanation given here is based on the assumption that it is in its normal position.

Here, as mentioned above, the working oil discharged from the hydraulic pump P is sent to the outer passage 57; this working oil goes from the motor side communication passage 51d through the motor opening 32b into the motor oil chamber 33a and the motor plunger 33 is pressed outward axially. The outer end of the motor plunger 33 which receives this axial outward pressing force is held in a sliding manner between the top dead center and bottom dead center of the motor swash plate member 31 in oscillation of the motor oscillating member 35. The motor cylinder 32 is rotated in a way that this axial outward pressing force moves the motor plunger 33 from the top dead center to the bottom dead center along the motor swash plate member 31.

For the sake of this motor cylinder rotation, as the motor plunger 33 reciprocates from its outermost position (called "bottom dead center") to its innermost position (called "top dead center"), the motor side cam ring 54 reciprocates the motor side spool 55 radially. As the motor cylinder 32 rotates in this way and the motor plunger 33 moves from the bottom dead center to the top dead center along the motor swash plate member 31, the motor plunger 33 is pushed inward and the working oil in the motor oil chamber 33a goes through the motor opening 32b and then through the motor side communication passage 51d to be sent into the inner passage 56. The working oil thus sent to the inner passage 56 goes through the pump side communication passage 51c and pump opening 22b into the pump oil chamber 23a.

As can be understood from the above explanation, when the pump casing 20 rotates subject to the rotational driving force of the engine E, working oil is discharged from the hydraulic pump P into the outer passage 57 and sent to the hydraulic motor M to rotate the motor cylinder 32. The working oil which has rotated the motor cylinder 32 is sent to the inner passage 56 and taken into the hydraulic pump through the inner passage 56. A hydraulic closed circuit which connects the hydraulic pump P and the hydraulic motor M in this way is constituted by the distribution valve 50 and the working oil discharged from the hydraulic pump P with rotation of the hydraulic pump P is sent through the hydraulic closed circuit into the hydraulic motor M to drive (rotate) the motor and the discharged working oil after driving the hydraulic motor M is sent through the hydraulic closed circuit back into the hydraulic pump P.

In this case, when the hydraulic pump is driven by the hydraulic engine E and the rotational driving force of the hydraulic motor M is transmitted to the wheels to run the vehicle, the outer passage 57 functions as a high pressure oil path and the inner passage 56 functions as a low pressure oil path. On the other hand, in a run on a downhill road or a situation that the wheel driving force is transmitted to the hydraulic motor M, the rotational driving force of the hydraulic pump P is transmitted to the engine E and engine braking occurs, the inner passage 56 functions as a high pressure oil path and the outer passage 57 functions as a low pressure oil path.

At this moment, since the pump cylinder 22 and the motor cylinder 32 are joined to the transmission output shaft 6 and rotated together, the pump cylinder 22 also rotates with rotation of the motor cylinder 32 as mentioned above and the relative rotating speed of the pump casing 20 and the pump cylinder 22 decreases. Therefore, the relation between the rotating speed Ni of the pump casing 20 and the rotating speed No of the transmission output shaft 6 (namely, the rotating speed of the pump cylinder 22 and motor cylinder 32) is expressed by the following equation (1) where Vp represents pump capacity and Vm motor capacity:

Equation 1

$$Vp \cdot (Ni-No) = Vm \cdot No \qquad (1)$$

The motor capacity Vm can be continuously varied by controlling oscillation of the motor oscillating member 35 through the motor servo system SV. In other words, when the rotating speed Ni of the pump swash plate member 21 is constant in the above equation (1), the rotating speed of the transmission output shaft 6 is continuously varied by varying the motor capacity Vm continuously. As can be understood from this, the speed is varied by oscillating the motor oscillating member 35 through the motor servo system SV to vary the motor capacity Vm.

Here, when the oscillating angle of the motor oscillating member 35 is decreased, the motor capacity Vm is decreased and, if the pump capacity Vp is constant and the rotating speed Ni of the pump swash plate member 21 is constant in the above equation (1), the rotating speed of the transmission output shaft 6 is increased so as to approach the rotating speed Ni of the pump swash plate member 21, namely continuous shift to the top gear position is performed. When the motor swash plate angle is zero, namely the swash plate is upright, theoretically the gear ratio (top gear ratio) is Ni=No, which leads to a hydraulic lock condition in which the pump casing 20 rotates together with the pump cylinder 22, motor cylinder 32 and transmission output shaft 6, resulting in mechanical power transmission.

Figure 10:
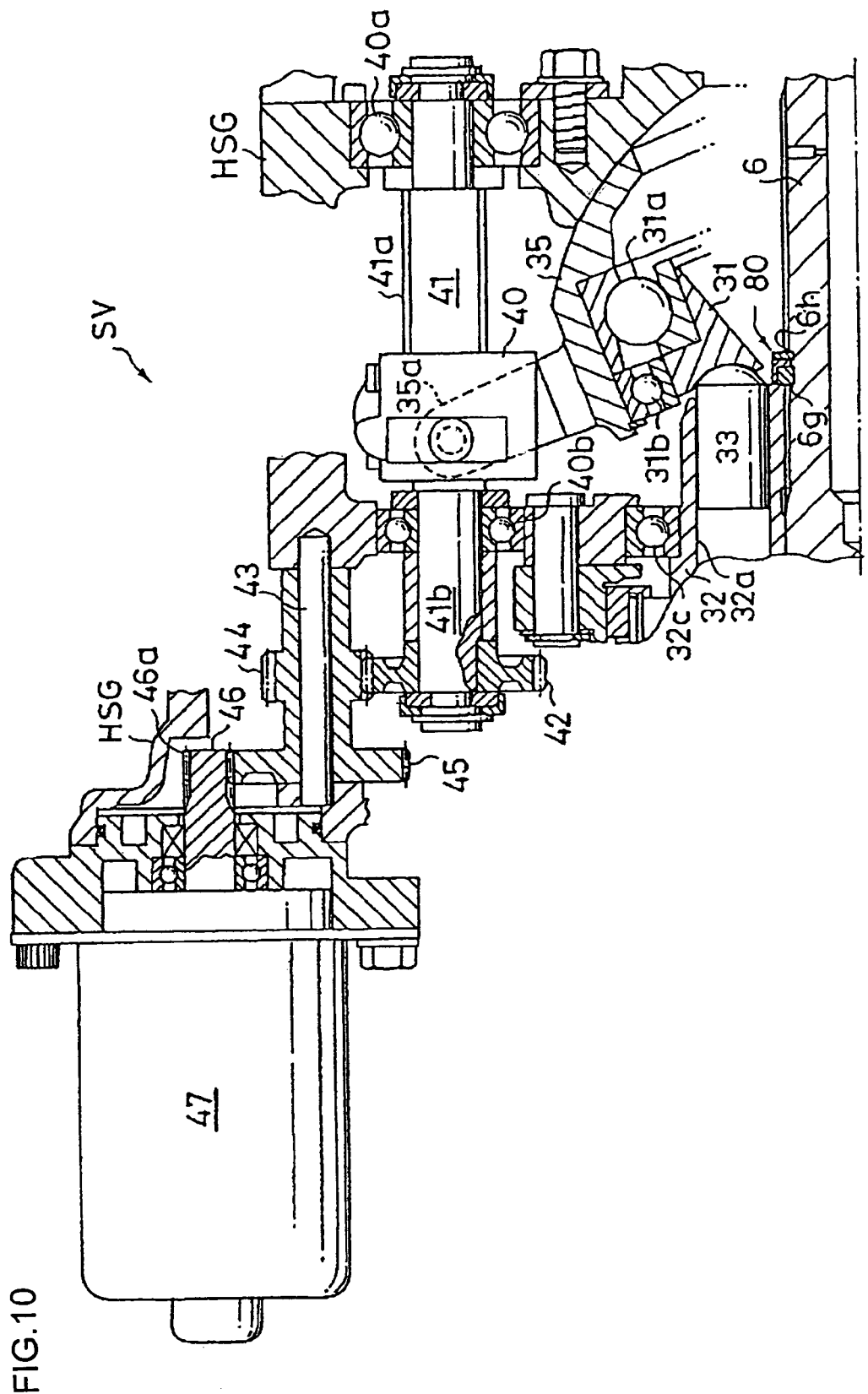
FIG. 10 is a sectional view which shows the motor servo system of the above hydrostatic continuously variable transmission.

Continuous motor capacity variation as mentioned above is performed by oscillating the motor oscillating member 35 to vary the motor swash plate angle. The servo motor system SV which oscillates the motor oscillating member 35 will be described below mainly referring to FIG. 10.

The motor servo system SV lies in the vicinity of the arm 35a of the motor oscillating member 35 and extends parallel to the transmission output shaft 6 and has a ball screw shaft 41 rotatably held on the transmission housing HSG by means of bearings 40a and 40b and a ball nut 40 screwed with a male screw 41a provided on the outer periphery of this ball screw shaft 41. On the inner periphery of the ball nut 40, a ball female screw (internal thread) is formed by many balls held in a thread pattern by a cage and this ball female screw is engaged with the male screw 41a. The ball nut 40 is connected with the arm 35a of the motor oscillating member 35 and when the ball screw shaft 41 rotates, the ball nut 40 moves to the left or right on the ball screw shaft 41, which causes the motor oscillating member 35 to oscillate.

In order to rotate the ball screw shaft 41 in this way, a swash plate control motor (electric motor) 47 is attached to the outer side face of the transmission housing HSG. An idle shaft 43 extends parallel to the drive shaft 46 of this swash plate control motor 47 and an idle gear member with gears 44 and 45 is rotatably mounted on this idle shaft 43. A gear 46a is formed at the tip of the drive shaft 46 of the swash plate control motor 47 and engaged with the gear 45. On the other hand, a gear 42 is joined to a shaft part 41b as a protrusion of the left part of the ball screw shaft 41 and this gear 42 is engaged with the gear 44.

Therefore, when the drive shaft 46 is rotated according to rotation control of the swash plate control motor 47, this rotation is transmitted to the gear 45 and then the gear 44, which rotates together with the gear 45, transmits it to the gear 42 to rotate the ball screw shaft 41. As the ball screw shaft 41 rotates, the ball nut 40 moves on the shaft 41 to the left or right and thus the motor oscillating member 35 oscillates. Since rotation of the swash plate control motor 47 is transmitted through the gears 46a, 45, 44 and 42 to the ball screw shaft 41 in this way, the transmission ratio can be freely set by adjusting the gear ratio of these gears appropriately.

The swash plate control motor 47 is exposed to the outside, behind and near the bottom of a rear cylinder 1 of the V cylinder engine E, as shown in FIG. 2. The cylinder 1 is integrated with the transmission housing HSG and the swash plate control motor 47 lies in the space between the rear cylinder 1 and the transmission housing HSG. Since the swash plate control motor 47 lies in the space between the rear cylinder 1 and the transmission housing HSG in this way, the space is effectively utilized: the motor is away from the pivotal connection axis 130a of the swing arm 130 and thus there is no limitation on the shape of the swing arm for avoidance of interference with the swing arm 130. Also, while the vehicle is running, the swash plate control motor 47 is protected from water splashes from under the vehicle body, raindrops coming from ahead, dust and the like. In addition, the swash plate control motor 47 is situated a little to the right from the center line CL in the vehicle body left-right direction so that during a run of the vehicle an air flow from ahead efficiently hits the swash plate control motor 47 to cool it effectively.

In the above hydrostatic continuously variable transmission CVT, when the inner passage 56 and the outer passage 57 are communicated, no high pressure oil is generated and power transmission between the hydraulic pump P and the hydraulic motor M is shut off. In other words, the clutch is controlled by controlling the communication (opening) between the inner passage 56 and the outer passage 57. For control of the clutch, the hydrostatic continuously variable transmission CVT is equipped with a clutch device CL. The clutch device CL is described below, referring to FIGS. 11 to 14 as well.

The clutch device CL is composed of: a rotor 60 joined to the end of the pump casing 20 with a bolt 60b; a weight 61 (ball or roller) received in plural receiver channels 60a extending radially and obliquely on the inner surface of the rotor 60; a disk-like pressure receiver 62 with an arm 62a facing the receiver channels 60a; a spring 63 biasing the pressure receiver 62 in a way for the arm 62a to press the weight 61 into the receiver channels 60a; and a valve spool 70 latched to a latch 62c on one end of the pressure receiver 62.

Figure 1:
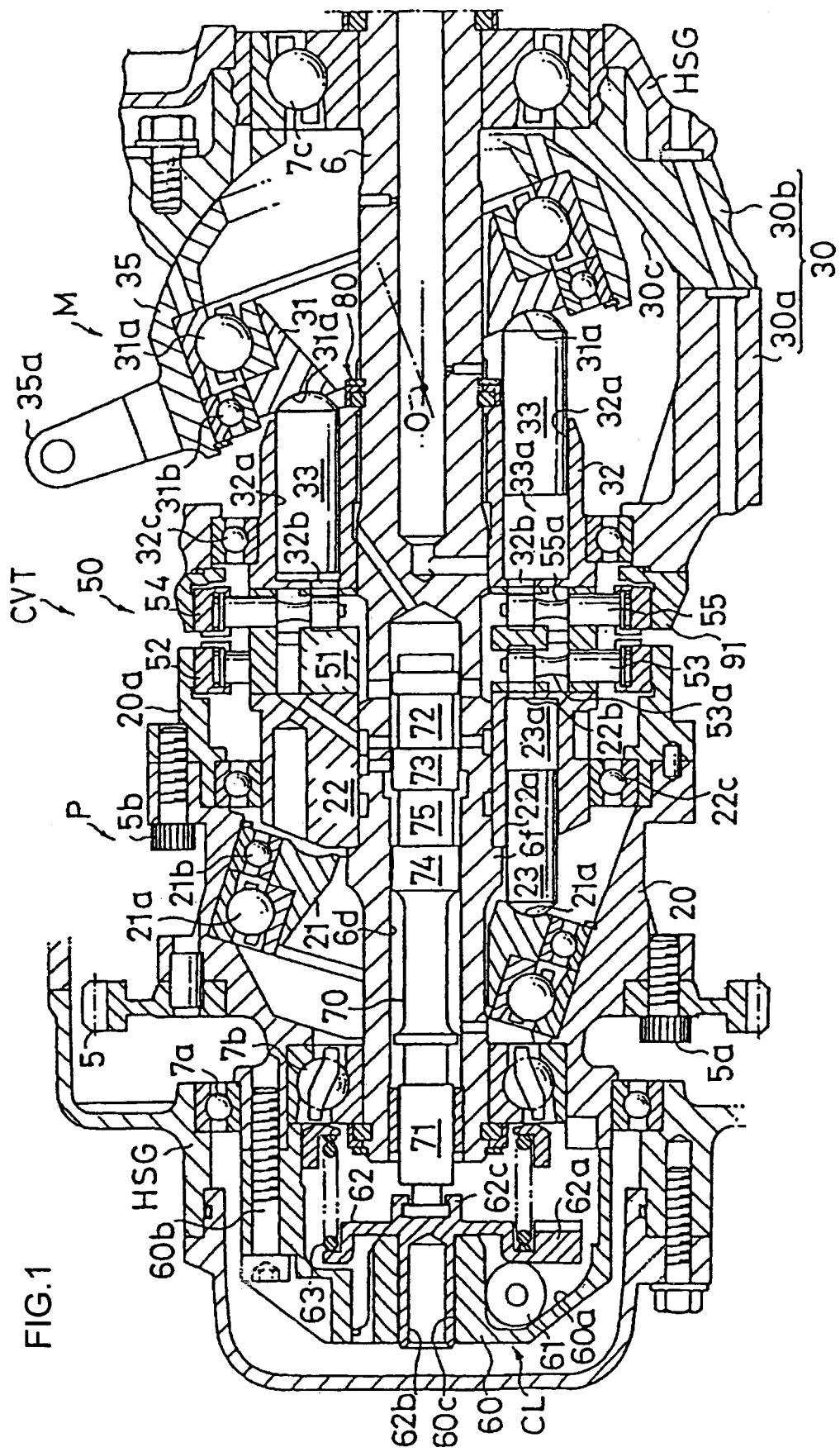
FIG. 1 is a sectional view which shows the structure of a hydrostatic continuously variable transmission according to the present invention.
Figure 11:
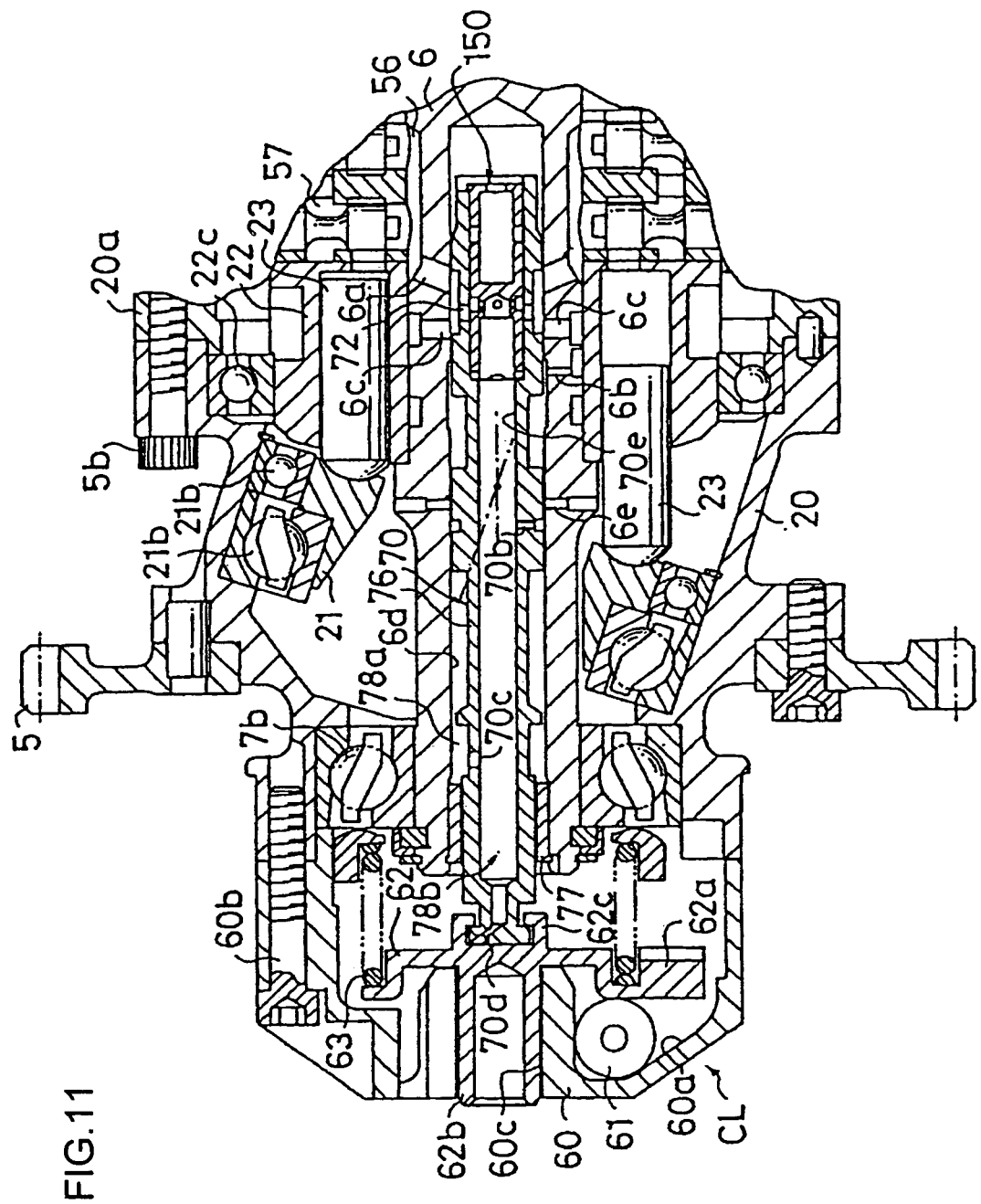
FIG. 11 is a sectional view which shows the structures of the hydraulic pump and clutch device of the above hydrostatic continuously variable transmission.

The rotor 60 has a through hole 60c with the rotation center axis as its center and the cylindrical portion 62b of the pressure receiver 62 is movably inserted into the through hole 60 and the pressure receiver 62 is axially movable. Therefore, when the pump casing 20 is still and the rotor 60 is not rotating, the biasing force given to the pressure receiver 62 by the spring 63 lets the arm 62a press the weight 61 into the receiver channels 60a. Since the receiver channels 60a extend obliquely as shown, the weight 61 is pushed inward radially and the pressure receiver 62 is in a left position as shown in FIGS. 1 and 11.

Figure 4:
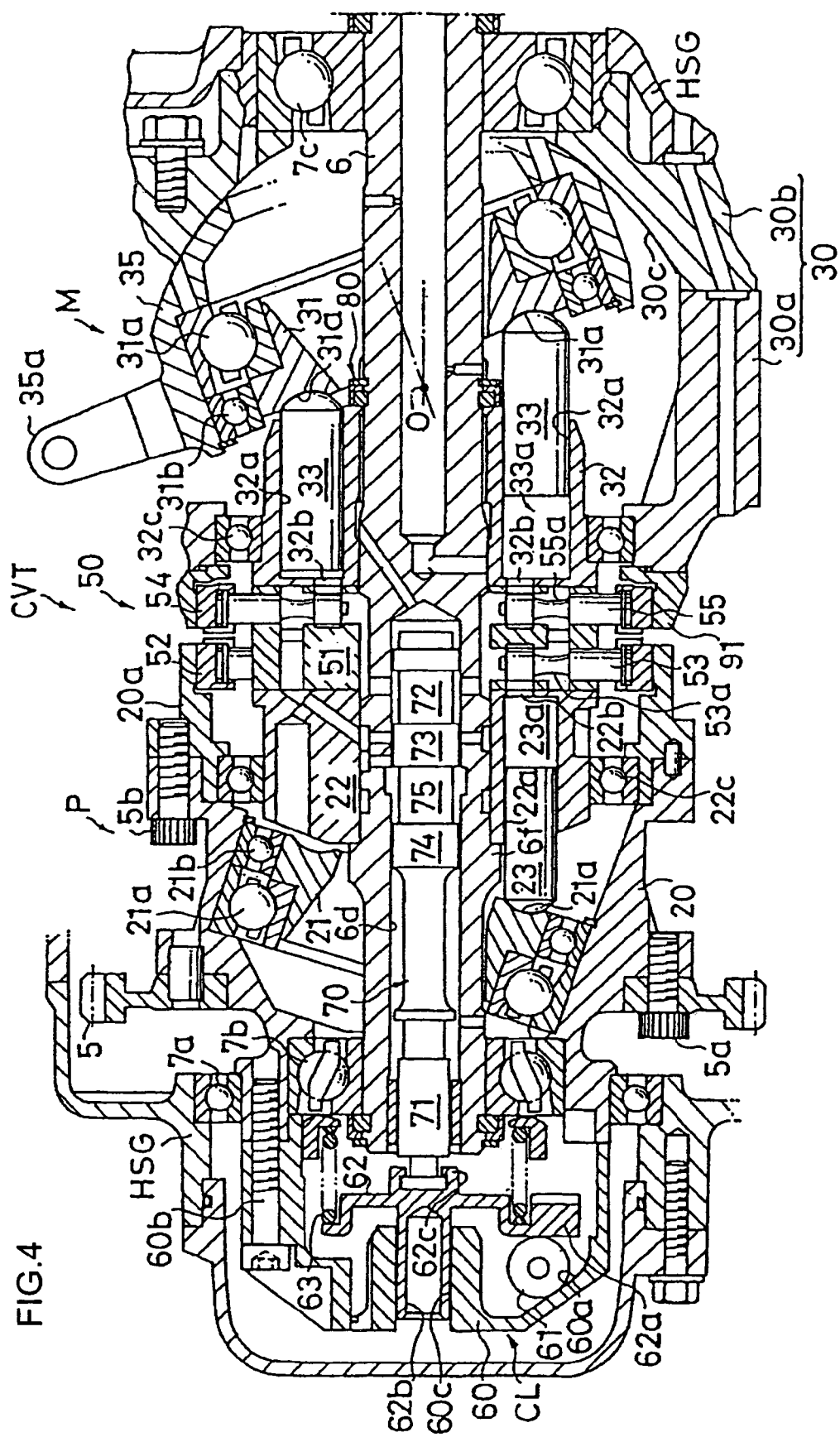
FIG. 4 is a sectional view which shows the structure of the above hydrostatic continuously variable transmission.

When the pump casing 20 is rotated in this condition and the rotor 60 is rotated, the weight 61 in the receiver channels 60a is radially pushed outward by a centrifugal force. When the weight 61 is radially pushed outward by a centrifugal force in this way, the weight 61 moves obliquely to the right along the receiver channels 60a and pushes the arm 62a to the right and the pressure receiver 62 moves to the right against the bias of the spring 63. The amount of rightward movement of the pressure receiver 62 varies depending on the centrifugal force working on the weight 61, namely the rotating speed of the pump casing 20; when the rotating speed is above a prescribed level, the pressure receiver 62 moves rightward to the position as shown in FIG. 4. Latched to the latch 62c of the pressure receiver 62 which thus moves to the left and right axially, the valve spool 70 is fitted into the spool hole 6d which is open to the end of the transmission output shaft 6 and extends axially; and it moves to the left or right axially together with the pressure receiver 62.

As can be understood from this, the rotor 60, weight 61 and pressure receiver 62 constitute a governor system which generates an axial governor force corresponding to the input rotating speed of the hydraulic pump P using the centrifugal force which works on the weight 61 with rotation of the pump casing 20.

On the other hand, as illustrated in detail in FIGS. 5, 6 and 11 to 14, the transmission output shaft 6 includes: an inner branch oil path 6a branching from the inner passage 56 and connecting to the spool hole 6d, and outer branch oil paths 6b and 6c connecting to the spool hole 6d through a communication passage 57a branching from the outer passage 57. FIGS. 5 and 12 correspond to FIG. 1 where it is shown that the pressure receiver 62 has moved leftward and the valve spool 70 has moved leftward. In this condition, the inner branch oil path 6a and the outer branch oil path 6c are connected through the right groove 72 of the valve spool 70 and the inner passage 56 and the outer passage 57 are communicated. On the other hand, FIGS. 6 and 14 correspond to FIG. 4 where it is shown that the pressure receiver 62 has moved to the right and the valve spool 70 has moved to the right. In this condition, the inner branch oil path 6a and the outer branch oil path 6c are disconnected by a central land 73 of the valve spool 70 and the inner passage 56 and the outer passage 57 are also disconnected. FIG. 13 shows that the valve spool 70 is in its neural position.

As mentioned above, when the pump casing 20 is still or not rotating, the valve spool 70 moves to the left and thus the inner branch oil path 6a and the outer branch oil path 6c are connected and power transmission between the hydraulic pump P and the hydraulic motor M is stopped and the clutch is released. When the pump casing 20 is rotated in this condition, the pressure receiver 62 gradually moves to the right by the centrifugal force which works on the weight 61 depending on its rotating speed and the valve spool 70 also moves to the right. As a consequence, the central land 73 of the valve spool 70 gradually disconnects the inner branch oil path 6*a* and the outer branch oil path 6*c* and gradually engages the clutch.

In the hydrostatic continuously variable transmission CVT according to this embodiment, when the engine E rotates the pump casing 20 and the engine rotating speed is low (idling), the valve spool 70 moves to the left and the clutch is released; when the engine rotating speed goes up, the clutch is gradually engaged.

The valve spool 70 is designed so that the relation between the outside diameter d1 of its central land 73 and the outside diameter d2 of its left land 74 is d1<d2. Therefore, when the valve spool 70 moves to the right and the clutch gets engaged, the oil pressure in the outer passage 57 which works on the inside of the left groove 75 of the valve spool 70 presses the valve spool 70 to the left. This leftward pressing force depends on the level of oil pressure working on the left groove 75 and the pressure receiving area difference attributable to the difference between the above outside diameters d1 and d2. While this pressure receiving area difference is constant, the oil pressure on the left groove 75 is an oil pressure in the outer passage 57 which varies depending on the driving force: the larger the driving force is, the higher the oil pressure is. This corresponds to an oil pressure providing means as defined in claims.

As can be understood from this, clutch control by movement of the valve spool 70 is performed according to the balance (Fgov=Fp+Fspg) among the governor force (Fgov) which is generated by a centrifugal force working on the weight 61 depending on the rotating speed of the pump casing 20, the biasing force of the spring 63 (Fspg), and the pressing force (Fp) generated by the oil pressure working on the left groove 75 of the valve spool 70. Concretely, the clutch is controlled so that it is engaged at a high rotating speed of the pump casing 20 and released at a high oil pressure in the outer passage 57 (as the driving force transmitted from the hydraulic pump P to the hydraulic motor M increases).

An intermediate state between these clutch engagement and disengagement states, or a partial clutch engagement state, is shown in FIG. 13. In this state, the right end 73*a* of the central land 73 of the valve spool 70 is slightly communicated with the outer branch oil path 6*b* and the inner passage 56 and the outer passage 57 are partially communicated (partial clutch engagement). In this partial clutch engagement state, slight axial movement of the valve spool 70 connects or disconnects the inner passage 56 and the outer passage 57; however, axial movement of the valve spool 70 is balanced among the governor force (Ggov), biasing force and the pressing force by oil pressure as described above, so if a sudden throttle operation should increase the pressing force by oil pressure rapidly, the valve spool 70 would work toward releasing the clutch and the inner passage 56 and the outer passage 57 would be repeatedly connected and disconnected, making it difficult to transmit power stably.

For this reason, a buffer mechanism is provided in order to prevent the valve spool 70 from moving too sensitively and stabilize the clutch performance; this buffer mechanism is described below referring to FIG. 11 as well as FIGS. 1 and 4. As illustrated, a variable oil chamber formation groove 76 is provided on the left of the left land 74 of the valve spool 70 and a guideline part 71 with a diameter smaller than that of the left land 74 is provided on the left of the variable oil chamber formation groove 76. The guideline part 71 is fitted into a guide member 77 provided in the left end of the spool hole 6*d* and a variable oil chamber 78*a* is formed on the outer periphery of the variable oil chamber formation groove 76 as surrounded by the spool hole 6*d*, guide member 77 and left land 74.

Furthermore, an oil reservoir formation hole 70*e* which extends axially is formed in the valve spool 70 and the right end of the oil reservoir formation hole 70*e* is open where a modulator valve 150 is disposed and its left end is closed where an orifice 70*a* is made. Consequently, the oil reservoir formation hole 70*e* is closed by the modulator valve 150, thus forming an oil reservoir oil chamber 78*b*. In the valve spool 70, a communication hole 70*c* which connects the variable oil chamber formation groove 76 and the oil reservoir formation hole 70*e* is made and the variable oil chamber 78*a* and the oil reservoir oil chamber 78*b* are connected with each other through the communication hole 70*c*.

The variable oil chamber 78*a* and oil reservoir oil chamber 78*b* thus connected through the communication hole 70*c* constitute a buffer mechanism. How it works is described next. When the valve spool 70 moves to the left in the axial direction, the capacity of the variable oil chamber 78*a* decreases because the guide member 77 is fixed in the spool hole 6*d*, and thus the working oil in the oil chamber is compressed by the left land 74. At this time, since the capacity of the oil reservoir oil chamber 78*b* cannot be changed, this compressive force works against the movement of the valve spool 70 to restrain and slow down the movement. On the other hand, when the valve spool 70 moves to the right in the axial direction, the capacity of the variable oil chamber 78*a* increases, but by adjusting (decreasing) the diameter of the communication hole 70*c*, a resisting force works against the force of increasing the capacity to restrain and slow down the movement of the valve spool 70.

Although the left end of the oil reservoir formation hole 70*e* is closed, it has an orifice 70*d*; oil flows through the orifice 70*d* and the magnitude of the above resisting force is controlled by the orifice 70*d*. The orifice 70*d* is open to the latch connection between the latch 62*c* of the pressure receiver 62 and the left end of the valve spool 70 so that the latch connection is lubricated with oil discharged through the orifice 70*d*.

In this buffer mechanism, a modulator valve 150 is provided in order to fill the variable oil chamber 78*a* and the oil reservoir oil chamber 78*a* with working oil and it is described below referring to FIGS. 12 to 14. The right groove 72 of the valve spool 70 has a communication hole 70*a* which communicates with the modulator valve 150 and working oil in the right groove 72 goes through the communication hole 70*a* into the modulator valve 150. The modulator valve consists of a so-called "reducing valve" and working oil in the right groove 72 is supplied to the oil reservoir oil chamber 78*b* so as to maintain the oil pressure in the oil reservoir oil chamber 78*b* at a level set by the modulator valve 150. Therefore, the variable oil chamber 78*a* and the oil reservoir oil chamber 78*b* are always filled with working oil whose pressure is set by the modulator valve 150.

Here, the oil in the oil reservoir oil chamber 78*b* is always discharged through the orifice 70*d*, so as much replenisher oil as the discharged oil is supplied through the modulator valve 150. Since this replenisher oil comes from the right groove 72 and the right groove 72 communicates with the low pressure oil path 56 and the high pressure oil path 57 depending on the clutch engagement condition, working oil in the low pressure oil path 56 and the high pressure oil path 57, or working oil in the hydraulic closed circuit, is used as replenisher oil. Therefore, working oil required for replenishment is always discharged from the hydraulic closed circuit and exchanged for fresh working oil (this working oil exchange system will be described later), which prevents rise in the temperature of the working oil in the closed circuit.

In addition, the valve spool 70 has a discharge hole 70b which runs from the oil reservoir oil chamber 78b (oil reservoir oil chamber formation hole 70e) through the outer surface of the left land 74 and the transmission output shaft 6 has a discharge hole 6e which runs from the spool hole 6d to the outside. As shown in FIG. 13, when the valve spool 70 is in a position of partial clutch engagement, the discharge holes 70b and 6e are communicated through an outer peripheral groove 70f of the valve spool 70. As a consequence, in the partial clutch engagement state, working oil in the oil reservoir oil chamber 78b is discharged through the discharge holes 70b and 6e to the outside.

As described above, in the partial clutch engagement state, the inner passage 56 and the outer passage 57 are partially communicated and in the hydraulic closed circuit, working oil flows through this partial communication area from the high pressure oil path to the low pressure oil path, so the temperature of working oil in the hydraulic closed circuit easily rises. However, when working oil in the oil reservoir oil chamber 78b is discharged through the discharge holes 70e and 6e to the outside in the partial clutch engagement state, as much replenisher oil as the discharged oil is supplied through the modulator valve 150. Since this replenisher oil comes from the right groove 72 and the right groove 72 communicates with the low pressure oil path 56 and the high pressure oil path 57 depending on the clutch engagement condition, working oil in the low pressure oil path 56 and the high pressure oil path 57, or working oil in the hydraulic closed circuit, is used as replenisher oil. Therefore, working oil required for replenishment is always discharged from the hydraulic closed circuit and exchanged for fresh working oil (this working oil exchange system will be described later), which effectively prevents rise in the temperature of the working oil in the closed circuit particularly in the partial clutch engagement state.

The above hydrostatic continuously variable transmission CVT has a lockup mechanism 90 in which, when the gear ratio is 1.0, or the input rotating speed of the hydraulic pump O and the output rotating speed of the hydraulic motor M are equal, the hydraulic closed circuit is closed to create a lockup condition. The lockup mechanism 90 is described below referring to FIGS. 15 to 17. As mentioned earlier, the lockup mechanism 90 has a motor eccentric member 91 fitted to an end of the motor casing 30b in a sliding manner. The motor eccentric member 91 is annular overall and the motor side cam ring 54 is fitted inside its inner peripheral surface 91a. A latch 91a is formed on the top end of the motor eccentric member 91 and the latch 91a is pivotally connected to the motor casing 30b by a latch pin 92 so that the motor eccentric member 91 can oscillate around the latch pin 92 with respect to the motor casing 30b.

For the motor eccentric member 91 to oscillate, a lockup actuator LA is mounted on the motor casing 30b at the bottom of the motor eccentric member 91. The lockup actuator LA is composed of: a cylinder 96 fixed to the motor casing 30b; a piston 94 slidably fitted into the cylinder hole of the cylinder 96; a lid member 95 attached to the cylinder 96 in a way to cover the cylinder hole; and a spring 97 which biases the piston 94 toward the lid member 95. The inside of the cylinder hole is split into two parts: a lockup working oil chamber 96a and a lockup release chamber 96b, with a spring 97 in the lockup release chamber 96b. An end of the piston 94 protrudes outward from the cylinder 96 and the protrusion 94a is pivotally connected through a connecting pin 93 to a connection 91b formed at the bottom of the motor eccentric member 91.

Figure 16:
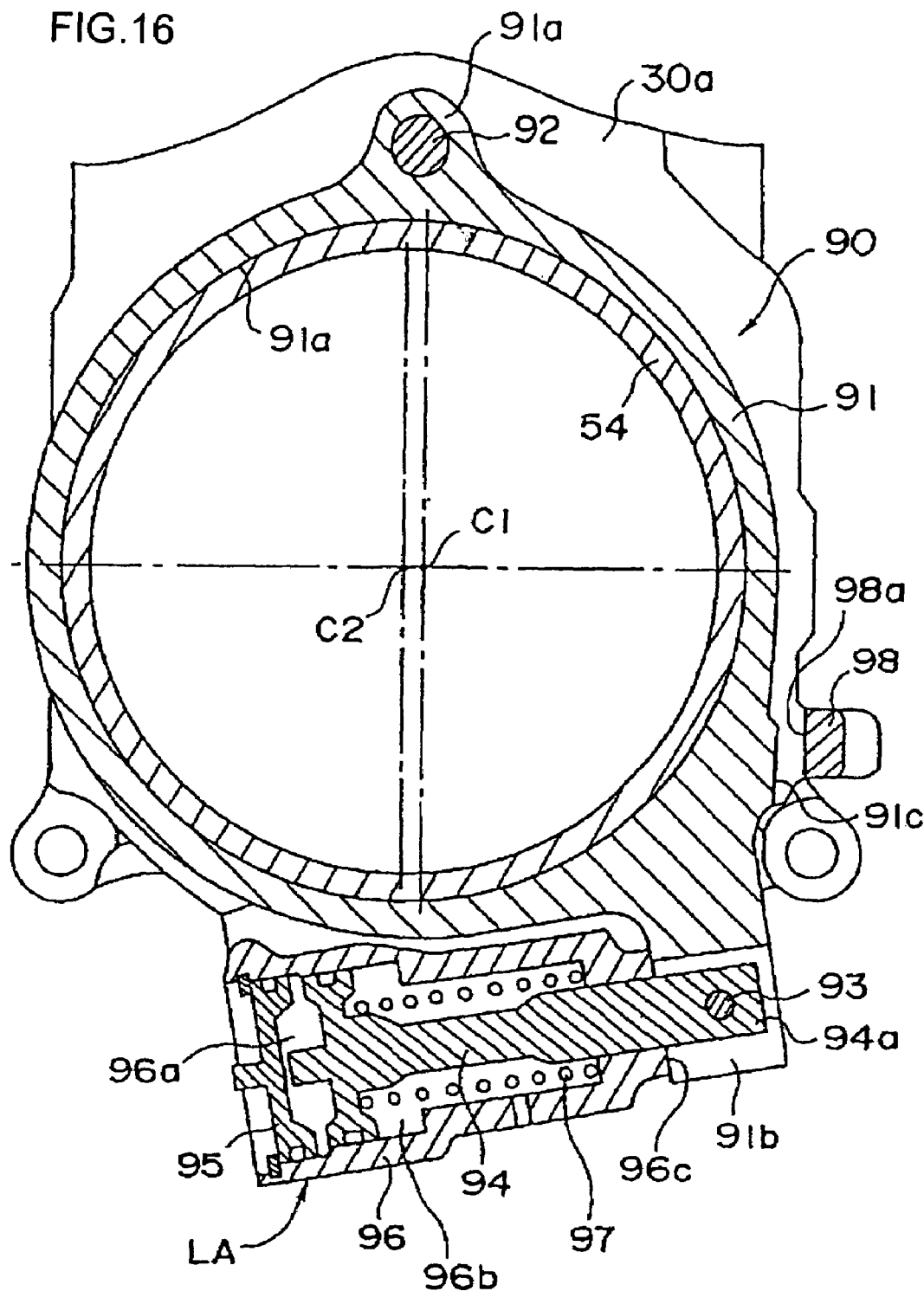
FIG. 16 is a sectional view taken along the arrowed line Y—Y of FIG. 15 which shows the structure of the above lockup mechanism in its normal position.

In this lockup mechanism 90, when the oil pressure in the lockup working oil chamber 96a is released, the biasing force of the spring 97 in the lockup release chamber 96b moves the piston 94 to the lid member 95. At this moment, as shown in FIG. 16, the connection 91b touches the outer end face 96c of the cylinder 96 and in this condition, the center C2 of the inner peripheral surface 91a of the motor eccentric member 91 is eccentric to the center C1 of the transmission output shaft 6 and output rotor (motor cylinder 32) and the motor eccentric member 91 is in its normal position.

Figure 17:
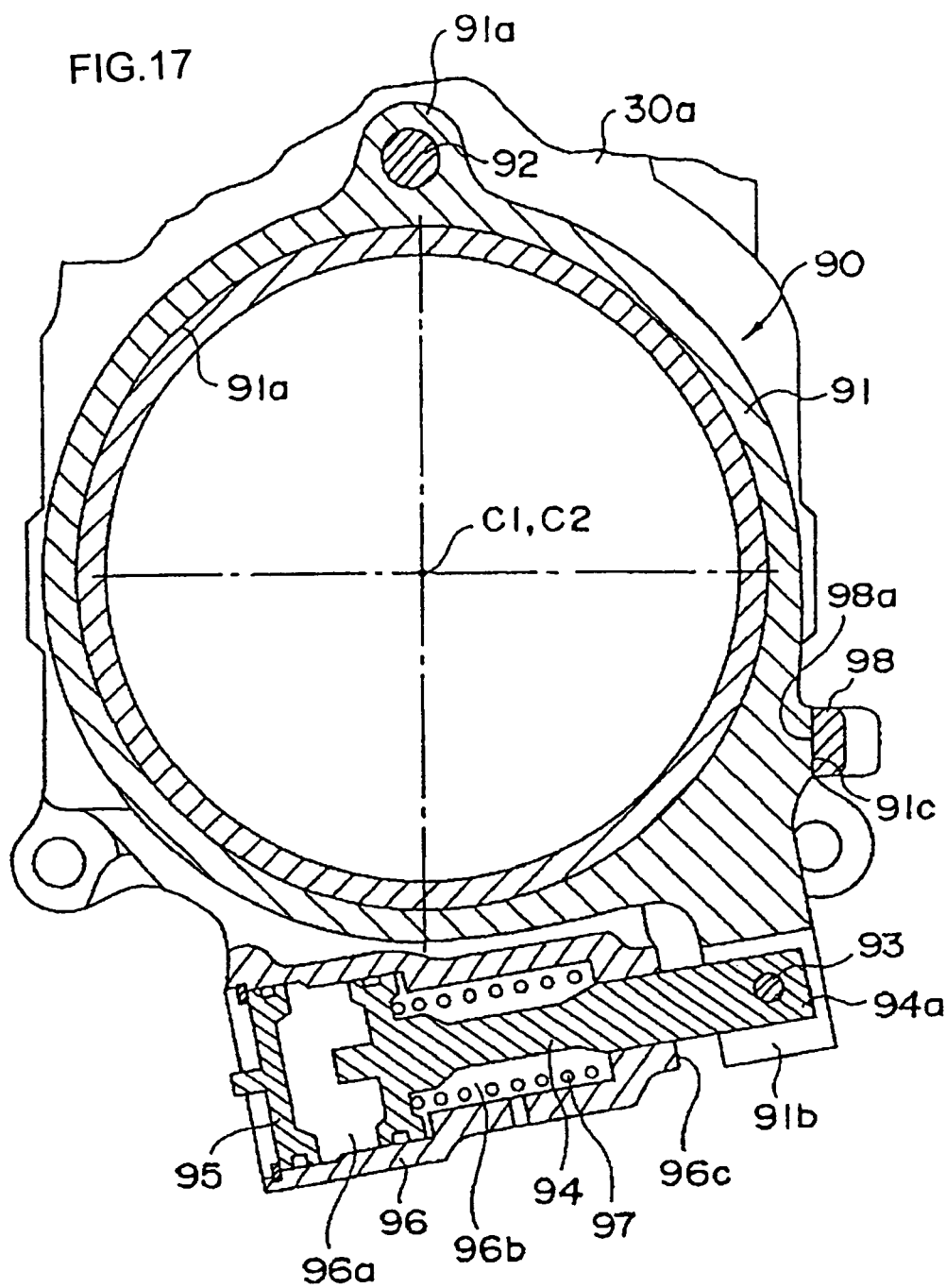
FIG. 17 is a sectional view taken along the arrowed line Y—Y of FIG. 15 which shows the structure of the above lockup mechanism in its lockup position.

On the other hand, when lockup working oil pressure is supplied to the lockup working oil chamber 96a, this oil pressure moves the piston 94 to the right (in the figure) against the bias of the spring 97 and thus the protrusion 94a further protrudes. This oscillates the motor eccentric member 91 around the latch pin 95 counterclockwise (in the figure) and as shown in FIG. 17, a contact surface 91c formed on a side of the motor eccentric member 91 touches a contact surface 98a of a positioning protrusion 98 integral with the motor casing 30a. In this condition, the center C2 of the inner peripheral surface 91a of the motor eccentric member 91 coincides with the center C1 of the transmission output shaft 6 and output rotor (motor cylinder 32) and the motor eccentric member 91 is in its lockup position.

As can be understood from the structures of the hydraulic motor M and distribution valve 50 as described earlier, when the motor eccentric member 91 is in its lockup position, the center of the motor side cam ring 54 fitted inside its inner peripheral surface 91a coincides with the rotation center of the motor cylinder 32 and even when the motor cylinder 32 rotates, the motor side spool 55 does not reciprocate and high pressure oil supply to the motor plunger 33 is stopped. At this time, there is communication with the low pressure oil path 56. Consequently, compression loss or working oil leakage in the motor plunger 33 is reduced; mechanical power loss in bearings, etc. is reduced because no high pressure is applied to the motor plunger 33; and sliding resistance in the pump side spool 53 is reduced, resulting in improvement in power transmission efficiency.

Figure 18:
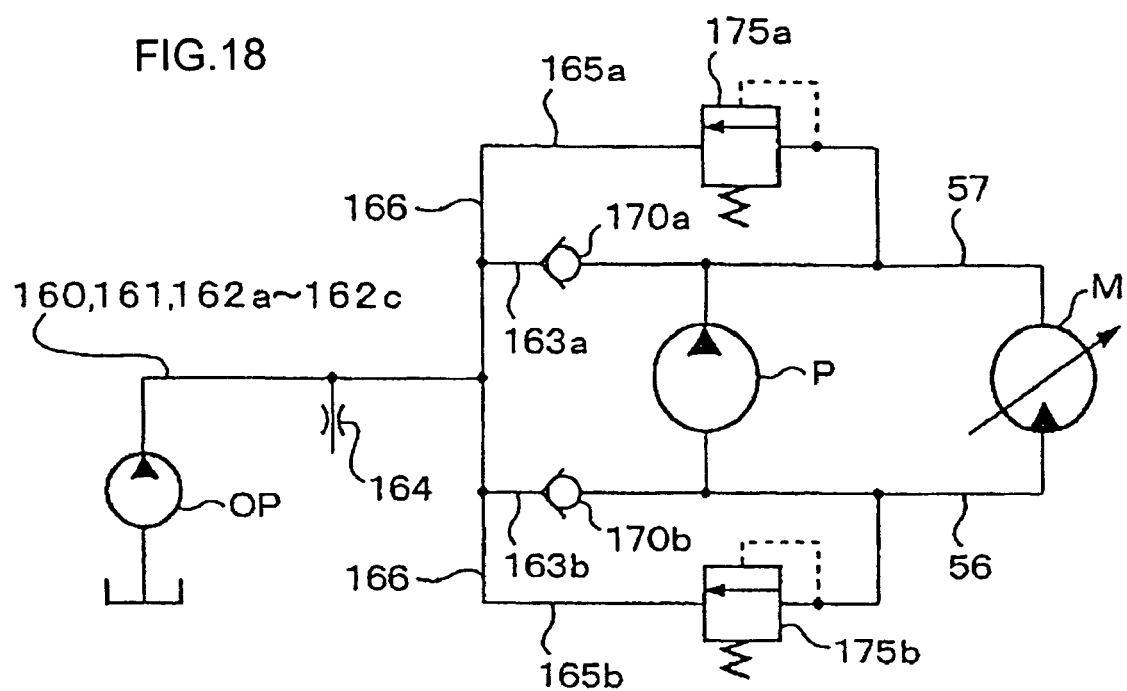
FIG. 18 is a hydraulic circuit diagram which shows the oil path arrangement of the above hydrostatic continuously variable transmission.

Next, a replenishment system which replenishes the hydraulic closed circuit with working oil is described referring to FIGS. 12 to 14 and 18. As shown in FIG. 18, working oil replenishment is made by an oil pump OP (see FIG. 3); oil which is discharged from the oil pump OP driven by the engine E goes through an oil path in the transmission housing HSG into an oil path 160 which extends axially in the transmission output shaft 6. An end of the oil path 160 is connected with an oil path 161 which extends radially in the transmission output shaft 6 and is open to the outer periphery. The oil path 161 further connects to oil paths 162a, 162b, and 162c which extend axially in the output rotor (motor cylinder 32, valve body 51 and pump cylinder 22) and in an end of the oil path 162c there is an orifice 164 which communicates with the outside so that the inside of the transmission is lubricated with working oil which flows out from the orifice 164.

The pump cylinder 22 incorporates a first check valve 170a for supplying replenisher oil into the outer passage 57 and a first relief valve 175a for relieving working oil when the oil pressure in the outer passage 57 exceeds a prescribed level, as shown in FIGS. 12 to 14. Furthermore, it also incorporates a second check valve 170b for supplying replenisher oil into the inner passage 56 and a second relief valve 175b for relieving working oil when the oil pressure in the outer passage 57 exceeds a prescribed level which are structurally similar to the above valves, though not shown in FIGS. 12 to 14.

As illustrated, the pump cylinder 22 incorporates an oil path 163a which connects the oil path 162c and the first check valve 170a so that working oil supplied from the oil pump OP is supplied as replenisher through the first check valve 170a to the outer oil path 57 as necessary (as working oil leaks from the hydraulic closed circuit). There are a plurality of oil paths 162a, 162b, and 162c; the pump cylinder 22 incorporates an oil path 163b which connects the oil path 162c and the second check valve 170b so that working oil supplied from the oil pump OP is supplied as replenisher through the second check valve 170b to the inner oil path 56 as necessary (as working oil leaks from the hydraulic closed circuit).

On the other hand, when the oil pressure in the outer passage 57 exceeds a level set by a biasing means, working oil relieved from the first relief valve 175a is discharged into a return oil path 165a formed in the pump cylinder 22. The return oil path 165a is annularly formed on the outer peripheral surface of the transmission output shaft 6 and communicated with an annular oil path 166 engaged and surrounded with the pump cylinder 22. The oil path 166 communicates through the oil path 163a to the oil path 162c, which suggests that working oil relieved from the first relief valve 175a is discharged into a replenisher oil supply oil path to which oil is supplied from the oil pump OP. Also working oil relieved from the second relief valve 175b goes through the return oil path 165b and the annular oil path 166 and the oil path 163b to be discharged into the oil path 162c, or the replenisher oil supply oil path, though not shown.

Since working oil relieved from the first and second relief valves 175a and 175b goes through the return oil paths 165a and 165b to be discharged into the replenisher oil supply oil path 162c in this way, relieved oil does not return into the hydraulic closed circuit and the temperature f oil in the hydraulic closed circuit does not rise. The oil pressure in the replenisher oil supply oil path 162c remains stable so working oil in the high pressure oil path is efficiently relieved.

The replenisher oil supply oil path extends from the transmission output shaft 6 into the output rotor, the first and second relief valves 175a, 175b and the return oil paths 165a, 165b are located in the pump cylinder 22 and the return oil paths 165a and 165b are connected to the replenisher oil supply oil path 162c in the pump cylinder 22, so the return oil paths 165a and 165b can be shortened so as to allow the pump cylinder 22 to house the high pressure relief structure in a compact manner. Besides, the return oil paths 165a and 165b are connected to the replenisher oil supply oil path 162c (and 163a and 163b) through the annular oil path 166 which extends circumferentially at its engagement with the pump cylinder 22 on the outer peripheral surface of the transmission output shaft 6 and the oil path connection structure in this part is simple.

So far an explanation has been made of an embodiment as a motorcycle which adopts a continuously variable transmission according to the present invention. However, the present invention is not limited to motorcycles but may be applied to various power transmission mechanisms such as vehicles including four-wheeled vehicles and cars and general-purpose machines.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A hydrostatic continuously variable transmission in which a hydraulic pump and a hydraulic motor are connected through a hydraulic closed circuit and the capacity of at least one of said hydraulic pump and hydraulic motor is varied to change the relative rotating speed of an input of said hydraulic pump and an output of said hydraulic motor, the transmission comprising:
   a valve spool movably provided in a spool hole which extends axially in a support shaft which rotatably holds said hydraulic pump and hydraulic motor;
   said support shaft including:
      a high pressure clutch oil path connected to a high pressure oil path of said closed circuit and a high pressure clutch port open to said spool hole;
      a low pressure clutch oil path connected to a low pressure oil path of said hydraulic closed circuit and having a low pressure clutch port open to said spool hole; and
      a communication groove between the outer periphery of said valve spool and the spool hole for enabling said valve spool to move between a clutch release position in which said high pressure clutch port and said low pressure clutch port are connected and a clutch engagement position in which an outer peripheral surface of said valve spool at least covers said high pressure clutch port; wherein
      said communication groove is connected to the outside of the spool hole through a main discharge oil path formed in said valve spool.

2. The transmission according to claim 1, wherein said main discharge oil path consists of an oil reservoir oil chamber extending axially in said valve spool and a working oil discharge hole made in said valve spool which penetrates from said oil reservoir oil chamber to an outside of the valve spool.

3. The transmission according to claim 1, wherein a shaft side auxiliary discharge oil path which is open to the outside of said valve spool at one end and to said spool hole at the other end is formed in said support shaft and a spool side auxiliary discharge oil path connected to said main discharge oil path and open to an outer peripheral surface is formed in said valve spool; and wherein said valve spool is in a partial clutch engagement position in which said communication groove is partially connected with said high pressure clutch port, said shaft side auxiliary discharge oil path and said spool side auxiliary discharge oil path are connected.

4. An internally dampened hydrostatic continuously variable transmission clutch valve, the valve comprising:
   a generally cylindrical body housed within in an elongated generally cylindrical spool hole, wherein the spool hole is formed axially within an output shaft;
   the cylindrical body constructed such that high pressure oil and low pressure oil channels within a closed circuit are connected or disconnected according to the axial position of the valve spool within the spool hole; and
   a variable oil chamber is positioned in the space between the body and the spool hole, and wherein the variable oil chamber is in fluid communication with an oil chamber inside the body and arranged such that axial movement of the body causes fluid to flow between the variable oil chamber and the oil chamber inside the body.

5. The clutch valve of claim 4, wherein decreasing an orifice size connecting the variable oil chamber with the oil chamber inside the body increases an amount of clutch valve dampening.

6. The clutch valve of claim 4, wherein the cylindrical body includes a portion having a relatively large diameter and a portion having a relatively small diameter, wherein the relatively large diameter portion is constructed to disconnect the high pressure oil channel from the low pressure oil channel and the relatively small diameter portion is constructed to connect the high pressure oil channel with the low pressure oil channel when aligned thereto.

7. The clutch valve of claim 4, wherein the oil chamber inside the body includes an oil passage in fluid communication with an outside of the spool hole.

8. A hydrostatic continuously variable transmission comprising:
   a hydraulic pump and a hydraulic motor that are connected trough a hydraulic closed circuit and the capacity of at least one of said hydraulic pump and hydraulic motor is varied to change the relative rotating speed of an input of said hydraulic pump and an output of said hydraulic motor; and
   a support shaft for supporting a cylinder of the pump and a cylinder of the motor, wherein the support shaft includes a high pressure oil path and a low pressure oil path, and a valve spool; wherein the position of the valve spool controls whether the high pressure oil path and the low pressure oil path are connected or disconnected, and the valve spool position within the support shaft is partially dependent on the rotational speed of the input of said hydraulic pump.

9. A transmission according to claim 8, wherein the valve spool is positioned in a spool hole arranged axially within the support shaft.

10. A hydrostatic continuously variable transmission comprising:
    a hydraulic pump and a hydraulic motor that are connected through a hydraulic closed circuit and the capacity of at least one of said hydraulic pump and hydraulic motor is varied to change the relative rotating speed of an input of said hydraulic pump and an output of said hydraulic motor;
    a support shaft for supporting a cylinder of the pump and a cylinder of the motor, wherein the support shaft includes a high pressure oil path and a low pressure oil path, and a valve spool; wherein the position of the valve spool controls whether the high pressure oil oath and the low pressure oil path are connected or disconnected;
    the valve spool is positioned in a spool hole arranged axially within the support shaft; and
    a variable capacity oil chamber is defined in the space between the valve spool and the valve spool hole.

11. The transmission according to claim 10, wherein the valve spool includes an internal oil chamber that is in fluid communication with the variable capacity oil chamber such that oil flows between the chambers when the valve spool is moved in the axial direction.

* * * * *